US012387593B2

(12) United States Patent
Gardner et al.

(10) Patent No.: US 12,387,593 B2
(45) Date of Patent: Aug. 12, 2025

(54) SYSTEMS AND METHODS FOR INTERACTIVE VEHICLE TRANSPORT NETWORKS

(71) Applicant: I R Kinetics Limited, Earby (GB)

(72) Inventors: David Gardner, Earby (GB); Andrew Bradley, Earby (GB)

(73) Assignee: I R Kinetics Limited, Earby (GB)

( * ) Notice: Subject to any disclaimer, the term of this patent is extended or adjusted under 35 U.S.C. 154(b) by 40 days.

(21) Appl. No.: 18/012,871

(22) PCT Filed: Jun. 29, 2021

(86) PCT No.: PCT/GB2021/051647
§ 371 (c)(1),
(2) Date: Dec. 23, 2022

(87) PCT Pub. No.: WO2022/003343
PCT Pub. Date: Jan. 6, 2022

(65) Prior Publication Data

US 2023/0252888 A1 Aug. 10, 2023

(30) Foreign Application Priority Data

Jun. 29, 2020 (GB) ..................................... 2009916
Sep. 23, 2020 (GB) ..................................... 2015236
Oct. 23, 2020 (GB) ..................................... 2016886

(51) Int. Cl.
*G08G 1/00* (2006.01)
*G08G 1/01* (2006.01)
(Continued)

(52) U.S. Cl.
CPC ......... *G08G 1/0108* (2013.01); *G08G 1/0133* (2013.01); *G08G 1/017* (2013.01);
(Continued)

(58) Field of Classification Search
CPC .... G08G 1/0108; G08G 1/0133; G08G 1/017; G08G 1/04; G08G 1/096725;
(Continued)

(56) References Cited

U.S. PATENT DOCUMENTS 7,286,929 B2 10/2007 Staton et al.
7,323,982 B2 1/2008 Staton et al.
(Continued)

FOREIGN PATENT DOCUMENTS

CN 108415011 A 8/2018
CN 110930692 A 3/2020
(Continued)

OTHER PUBLICATIONS

Becker, D. et al., "Multi-Modal Identification and Tracking of Vehicles in Partially Observed Environments," 2014 International Conference on Indoor Positioning and Indoor Navigation (IPIN), IEEE, Oct. 27, 2014, pp. 77-86.
(Continued)

*Primary Examiner* — Shardul D Patel
(74) *Attorney, Agent, or Firm* — Fenwick & West LLP

(57) ABSTRACT

The present invention concerns a vehicle tracking device for tracking one or more vehicles at a geographic location of a transport network within which the one or more vehicles are able to move, the vehicle tracking device comprising: one or more infra-red (IR) sensors having a field of view and being configured to detect IR radiation being emitted from or reflected by the one or more vehicles at the geographic location within the field of view; a receiver configured to receive unique identification data which uniquely identifies each of the one or more vehicles and position data which indicates an initial position of each of the one or more vehicles when the one or more vehicles enter the field of view at the geographic location; a processor configured to
(Continued)

determine current kinematic data of the one or more vehicles in at least two dimensions based upon the IR radiation detected by the one or more IR sensors, the received unique identification data and the received position data; and a transmitter configured to transmit the determined current kinematic data of a particular vehicle of the one or more vehicles to a kinematic data receiver spaced apart from the transmitter. The transmitter of a first vehicle tracking device is configured to transmit the current kinematic data determined at the first vehicle tracking device and unique identification data of the one or more vehicles to a second vehicle tracking device of the plurality of tracking devices and the receiver of the first vehicle tracking device is configured to receive current kinematic data determined at a third vehicle tracking device of the plurality of vehicle tracking devices and unique identification data of the one or more vehicles from a third vehicle tracking device.

45 Claims, 13 Drawing Sheets

(51) Int. Cl.
*G08G 1/017* (2006.01)
*G08G 1/04* (2006.01)
*G08G 1/0967* (2006.01)
*G08G 5/72* (2025.01)
*G07C 5/00* (2006.01)

(52) U.S. Cl.
CPC ......... *G08G 1/04* (2013.01); *G08G 1/096725* (2013.01); *G08G 1/096766* (2013.01); *G08G 5/723* (2025.01); *G07C 5/008* (2013.01)

(58) Field of Classification Search
CPC ........... G08G 1/096766; G08G 5/0078; G08G 1/096716; G08G 1/096741; G08G 1/096783; G08G 1/161; G08G 5/0013; G08G 5/0026; G08G 5/0052; G08G 5/0082; G08G 5/045; G08G 1/0116; G08G 1/00; G07C 5/008
USPC .......................................................... 701/117
See application file for complete search history.

(56) References Cited

U.S. PATENT DOCUMENTS 9,612,123 B1 4/2017 Levinson et al.
2014/0159925 A1* 6/2014 Mimeault ............... G01S 17/86 340/935
2017/0302364 A1 10/2017 Cesarano
2018/0141562 A1 5/2018 Singhal
2018/0218533 A1* 8/2018 Millin ..................... G06T 17/05
2019/0143935 A1* 5/2019 Flick ........................ G07C 5/08 701/2
2019/0392712 A1 12/2019 Ran et al.
2020/0118438 A1 4/2020 Sandbrook

FOREIGN PATENT DOCUMENTS

EP 2196973 A1 6/2010
JP 2012-89146 A 5/2012
JP 2014-191664 A 10/2014
WO WO 2013/128427 A1 9/2013
WO WO 2017/079460 A2 5/2017
WO WO 2017/079460 A3 8/2017
WO WO 2019/043446 A1 3/2019
WO WO 2019/156956 A2 8/2019
WO WO 2020/144245 A1 7/2020

OTHER PUBLICATIONS

GB Search Report Under Section 17, GB Application No. GB2015236.9, Oct. 6, 2020, 5 pages.
Kumar, et al., "Indoor Localization of Vehicles Using Deep Learning," Proceedings of the IEEE $17^{th}$ International Symposium on a world of Wireless, Mobile and Multimedia Networks, Jul. 26, 2016, pp. 1-6.
PCT International Search Report and Written Opinion, PCT Application No. PCT/GB2021/051647, Nov. 5, 2021, 16 pages.
Canadian Intellectual Property Office, Office Action, Canadian Patent Application No. 3,182,284, May 29, 2024, 3 pages.
Eurasian Patent Office, Office Action w/Translation, Eurasian Patent Application No. 202293303, Nov. 3, 2023, 12 pages.
European Patent Office, European Examination Report and Written Opinion, European Patent Application No. 21751830.7, Jun. 10, 2024, 5 pages.
"NXP introduced the S32V graphics processor for computer vision tasks," Sep. 21, 2017, posted on the Macro Team portal: <https://macroteam.ru/company/news/nxp_predstavila_graficheskij_processor_s32v_dlya_zadach_mashinnogo_zreniya/>.
United Arab Emirates Intellectual Property Office, Office Action, United Arab Emirates Patent Application No. P6002804/2022, Feb. 15, 2024, eight pages.
Saudi Authority for Intellectual Property, Office Action, SA Patent Application No. 522441925, Dec. 17, 2024, 18 pages.
China National Intellectual Property Office, Office Action, CN Patent Application No. 202180047194.9, Jun. 19, 2025, 14 pages.
Japanese Patent Office, Office Action, Japanese Patent Application No. 2022-581477, Jun. 24, 2025, 12 pages.

* cited by examiner

SYSTEMS AND METHODS FOR INTERACTIVE VEHICLE TRANSPORT NETWORKS

FIELD OF THE INVENTION

The present invention is concerned with systems and methods for interactive vehicle transport networks, such as those involving autonomous vehicles. More particularly though not exclusively, the present invention is directed to improvements in or relating to systems and methods for the operation of transport networks involving ground-based or airborne vehicles providing transportation of passengers or goods within cities, urban areas or along, above or near designated motorways, freeways, roads, railways or other routes between cities and urban areas. Any or all of the vehicles may be anywhere on the scale from fully autonomous to fully driver/pilot controlled. Also, they may or may not be linked to local, regional, or national traffic management systems. Such interactive systems and methods can not only track vehicles but can also be involved in corresponding data management and/or communications concerning such vehicles.

BACKGROUND OF THE INVENTION

With ongoing developments in autonomous vehicle operation, there exists a need to adapt traffic management systems to take advantage of the new capabilities of autonomous vehicles. In particular, as vehicles are increasingly capable of regulating their own movement, some of the disadvantages of user operation are removed, such as a driver or pilot's reaction speeds, concentration levels, tiredness etc. As a result, autonomous vehicles are more able to react quickly to environmental hazards and as a result, higher speeds and higher densities of vehicles are able to be safely achieved than when compared to user operated vehicles, where factors such as thinking distance must be applied when considering safe stopping distances.

In order to enable such traffic management, it is necessary for the vehicles to have access to accurate kinematic data regarding themselves and each of the vehicles in their proximity, which enable appropriate actions to be taken. This will include kinematic data of both a particular vehicle which is to take an action, as well as other vehicles in its vicinity which may affect the decision of which actions should be taken.

Current technology architecture relies on the principle that sensors onboard the vehicles provide each vehicle independently with its own situational awareness with which it can then reason about its environment and make and enact its own decisions.

Over recent years, commercially available situational sensing and geo-location technologies including RADAR (Radio Detection And Ranging), LIDAR (Light Imaging, Detection & Ranging), GNSS (Global Navigation Satellite Systems), EO (Electro-Optic) sensors and IR (Infra-Red) sensors have all reduced in mass, size, power consumption, heat output and susceptibility to environmental hazards such as mechanical shock, vibration and electro-magnetic interference to the extent that in principle they can be integrated into commercial vehicles (e.g. buses, trucks, taxis, drones) and domestic vehicles (e.g. cars, personal flying vehicles) to work in combination to provide situational awareness, potentially enabling driverless or pilotless operation. However, the complexity of all such approaches to situational awareness based on multiple sensors and sensor fusion in the safety critical application of driverless/pilotless vehicles is considerable. The authors' experience in defence and aerospace is that this complexity inevitably drives up vehicle cost and increases safety hazard risks. Furthermore, it becomes increasingly difficult to adopt a common approach, such that standardisation becomes challenging. Despite the huge investments made by a number of large technology companies in driverless cars the past decade has shown extremely slow progress, with safety hazard risks becoming increasingly of concern to the extent that the potential for regulatory approval of driverless vehicles is brought into question.

In some known systems, an attempt is made to implement roadside, in road or above road sensing equipment to detect, localise, track, and communicate with vehicles for the purpose of, for example, traffic flow management. However, typically these systems are unable to achieve such detection with the real-time kinematic accuracy and reliability necessary for safe autonomous navigation in traffic streams at currently legislated speeds and advisory vehicle separations, let alone any increased traffic flow rates.

Using a representative example of traffic flowing at a typical speed of 100 km/h (28 m/s) on a motorway or freeway, if the ground truth (i.e. the physical reality) of a vehicle's longitudinal position is to be measured every 50 cm of travel to an accuracy of 5 cm, then the measurement must be performed to that accuracy and provided repeatedly with a periodicity of around 20 ms, equivalent to a frequency of around 50 Hz. Existing roadside systems are unable to achieve such accuracy and frequency.

It is an object of the present invention to address at least one or more of the problems described above.

SUMMARY OF THE INVENTION

According to a first aspect the present embodiments there is provided a vehicle tracking device for tracking one or more vehicles at a geographic location of a transport network within which the one or more vehicles are able to move, the vehicle tracking device comprising: one or more infra-red (IR) sensors having a field of view and being configured to detect IR radiation being emitted from or reflected by the one or more vehicles at the geographic location within the field of view; a receiver configured to receive unique identification data which uniquely identifies each of the one or more vehicles and position data which indicates an initial position of each of the one or more vehicles when the one or more vehicles enter the field of view at the geographic location; a processor configured to determine current kinematic data of the one or more vehicles in at least two dimensions based upon the IR radiation detected by the one or more IR sensors, the received unique identification data and the received position data; and a transmitter configured to transmit the determined current kinematic data of a particular vehicle of the one or more vehicles to a kinematic data receiver spaced apart from the transmitter.

In some embodiments, the particular vehicle is a ground-based vehicle. In such embodiments, the vehicle tracking device may be provided with terrain mapping data, and the processor may be configured to determine current kinematic data in three dimensions based upon one or more of the detected IR radiation, the unique identification data, previously-determined kinematic data of each of the one or more vehicles and the terrain mapping data. In alternate embodiments, the particular vehicle is an airborne vehicle.

In further embodiments, the one or more vehicles comprises at least two vehicles and one of the vehicles is a ground-based vehicle and the other vehicle is an airborne vehicle, and wherein the one or more IR sensors comprises at least two sensors, one IR sensor being configured to detect IR radiation being emitted from or reflected by the ground-based vehicle and the other IR sensor being configured to detect IR radiation being emitted from or reflected by the airborne vehicle.

In yet further embodiments, the processor is configured to use previously determined current kinematic data of the one or more vehicles as an input to the processor for determination of the current kinematic data for each of the one or more corresponding vehicles. In some embodiments, the processor is configured to determine current kinematic data of the one or more vehicles at a frequency of at least 50 Hz.

In some embodiments, the receiver is additionally configured to receive data relating to a ground-space envelope or an air space envelope of the one or more vehicles and the processor is arranged to use the ground-space envelope or air space envelope to determine relative positioning of the one or more vehicles.

In some embodiments, the vehicle tracking device further comprises an IR emitter configured to emit IR radiation toward the one or more vehicles.

In further embodiments, the transmitter is configured to transmit the determined current kinematic data to a kinematic data receiver of a particular vehicle. In some embodiments, the transmitter is configured to transmit the determined current kinematic data of each of the one or more vehicles to a respective kinematic data receiver of the one or more vehicles. In alternate embodiments, the transmitter is configured to transmit the determined kinematic data to a kinematic data receiver of a remotely located Traffic Management System (TMS). In further arrangements of the above embodiments, the processor may further configured to generate a control signal for controlling the particular vehicle of the one or more vehicles based upon the determined current kinematic data of the at least one of the one or more vehicles, wherein the control signal includes instructions which when executed by the particular vehicle cause an alteration of a velocity or position of the particular vehicle, and where the transmitter is further configured to transmit this control signal to the particular vehicle.

In embodiments of this aspect, at least one of the one or more IR sensors is configured to detect IR radiation emitted from or reflected by a fixed geographical reference point, and the processor is further configured to: determine a position of the vehicle tracking device with respect to the fixed geographical reference point; and use the determined position of the vehicle tracking device when determining the current kinematic data of the one or more vehicles.

In further embodiments, the current kinematic data of the one or more vehicles determined by the processor, comprises at least a geographic position over time of the corresponding vehicle. In yet further embodiments, the vehicle tracking device is configured to monitor an entry point with a fixed position, and to receive data relating to the fixed position at a particular point in time as the initial position of each of the one or more vehicles. The processor may be further configured to generate a pull request to be transmitted by the transmitter which requests the transmission of the unique identifier data and initial position data from the one or more vehicles.

In an additional aspect of the present embodiments, there is further provided a vehicle tracking system for tracking one or more vehicles, the vehicle tracking system comprising a plurality of vehicle tracking devices as described in any of the arrangements of the first aspect arranged in a network, and where the transmitter of a first vehicle tracking device is configured to transmit the current kinematic data determined at the first vehicle tracking device and unique identification data of the one or more vehicles to a second vehicle tracking device of the plurality of tracking devices and the receiver of the first vehicle tracking device is configured to receive current kinematic data determined at a third vehicle tracking device of the plurality of vehicle tracking devices and unique identification data of the one or more vehicles from a third vehicle tracking device.

In further embodiments of this aspect, the processor of the second vehicle tracking device is further configured to compare current kinematic data of at least one of the one or more vehicles determined locally at the second device with current kinematic data received from and determined at the first vehicle tracking device to determine an agreement between the locally determined current kinematic data and the received kinematic data. In such cases, the second vehicle tracking device may receive the results of data comparisons between at least two other vehicle tracking devices and the processor of the second tracking device may be configured to use voting to identify a tracking device that is behaving inconsistently.

In yet further embodiments of this aspect, at least two of the plurality of vehicle tracking devices are arranged to be located geographically adjacent to each other and the IR sensors of the adjacently-located vehicle tracking devices have partially overlapping fields of view.

In some embodiments of this aspect, the vehicle tracking system further comprises a remote communications device comprising a remote data receiver configured to receive remote data from a wide area communications network; and a remote data transmitter configured to transmit the remote data to one or more of the plurality of vehicle tracking devices; wherein the one or more of the plurality of vehicle tracking devices are configured to receive the remote data and to transmit the received remote data to at least one of the one or more vehicles. The remote communications device may be configured to transmit the received remote data to each of the plurality of vehicle tracking devices. The remote communications device may further be configured to transmit the received remote data to each of the plurality of vehicle tracking devices in parallel. The current vehicle tracking device of the plurality of vehicle tracking devices may further be configured to: receive the remote data transmitted from the remote communications device directly or via another one of the plurality of vehicle tracking devices; and transmit the received remote data to a further one of the plurality of vehicle tracking devices.

In some of the above embodiments, the remote communications device may be further configured to receive local data from one or more of the plurality of vehicle tracking devices and to transmit the local data to the wide area communications network.

In yet further arrangements of the above embodiments, a first one of the plurality of vehicle tracking devices is configured to transmit the determined current kinematic data of the vehicle tracking device to the remote communications device and the remote communications device is configured to receive the determined current kinematic data from the first one of the plurality of vehicle tracking devices. In such arrangements, a second one of the plurality of vehicle tracking devices may be configured to receive the determined current kinematic data from the remote communications device. The remote communications device may be further configured to transmit the determined current kinematic data, local to the system, to a remotely-located interaction device. The remote communications device may be communicably coupled to a Traffic Management System (TMS) and may be configured to transmit determined current kinematic data to the TMS. The remote communications device may be configured to receive determined current kinematic data from the TMS. The remote data receiver may comprise a satellite communications receiver. The remote data receiver may comprise a OneWeb satellite communications receiver. The remote data receiver may comprise a 4G or 5G radio telecommunications receiver. The remote data receiver may comprise a wired network communications receiver.

The remote data may comprise a control signal for controlling a particular vehicle of the one or more vehicles based upon the determined current kinematic data of the at least one of the one or more vehicles, wherein the control signal includes instructions which when executed by the particular vehicle cause an alteration of a velocity or position of the particular vehicle, and where the transmitter of a particular vehicle tracking device proximate to the particular vehicle may be further configured to transmit the control signal to the particular vehicle.

In some embodiments, wherein the remote communications device comprises a plurality of remote communications devices, each one of the remote communications devices being positioned in a location geographically spaced apart from other ones of the plurality of remote communications devices and being configured to transmit the remote data to one or more of the plurality of vehicle tracking devices provided within a geographical region local to the location.

In further embodiments of this aspect, the system further comprises a local communications device comprising: a local data receiver configured to receive local data from one or more of the plurality of vehicle tracking devices; and a local data transmitter configured to transmit the local data to a remotely-located device via a wide area communications network, wherein the one or more of the plurality of vehicle tracking devices are configured to receive local data from at least one of the one or more vehicles and to transmit the received local data to the local communications device. The local data may comprise one or more of: vehicle diagnostics and prognostics data, driver condition data, driver health data, driver or passenger activity data and vehicle telemetry data. The local data may comprise any data whatsoever originating from the vehicle, its contents or occupants. In some embodiments, the one or more vehicles are airborne vehicles and a first subset of the plurality of vehicle tracking devices are configured to track one or more airborne vehicles moving at a first altitude and a second subset of the plurality of vehicle tracking devices are configured to track one or more airborne vehicles moving at a second altitude.

In a further aspect of the present embodiments, there is provided a method of tracking one or more vehicles at a geographic location in a transport network within which the one or more vehicles are able to move, the method comprising: providing a vehicle tracking device, the tracking device having a field of view; receiving unique identification data which uniquely identifies each of the one or more vehicles and position data which indicates an initial position of each of the one or more vehicles at the geographic location; detecting IR radiation being emitted from or reflected by the one or more vehicles at the geographic location; determining current kinematic data of the one or more vehicles based upon the detected IR radiation, the received unique identification data of each of the one or more vehicles and the position data; and transmit the determined current kinematic data of a particular vehicle of the one or more vehicles to a spaced-apart receiving position. In some embodiments, the spaced-apart receiving position can be at the same general geographical location as the vehicle tracking device but physically spaced apart. In other embodiments, the spaced-apart receiving position can be at a different geographical location to the vehicle tracking device.

In some arrangements of this aspect, the transmitting step comprises transmitting the current kinematic data to at least one other vehicle tracking device of a plurality of tracking devices at the spaced-apart receiving position. The transmitting step may further comprise transmitting the current kinematic data to a particular vehicle at the spaced-apart receiving position. It is to be appreciated that the term 'current kinematic data' covers not only current values of kinematic variables such as speed position, momentum, acceleration etc., but also covers recent historical data pertaining to the vehicle such as the above-mentioned variable parameters for a short period of time preceding the transmitting (for example kinematic variables recorded every 40 seconds over a time period of 10 seconds, or 1 minute or 10 minutes).

In further arrangements of this aspect, the method further comprises providing a plurality of the vehicle tracking devices arranged in a network and wherein a first vehicle tracking device of the plurality of vehicle tracking devices, in use, transmits the current kinematic data determined at the first vehicle tracking device and unique identification data of the one or more vehicles to a second vehicle tracking device of the plurality of tracking devices and the first vehicle tracking device, in use, receives current kinematic data determined at a third vehicle tracking device of the plurality of vehicle tracking devices and unique identification data of the one or more vehicles from the third vehicle tracking device; the method further comprising receiving at a remote communications device remote data from a wide area communications network; and transmitting the remote data to at least one of the plurality of vehicle tracking devices; wherein the at least one of the plurality of vehicle tracking devices, in use, receives the remote data and, in use, transmits the received remote data to at least one of the one or more vehicles.

In yet further embodiments of this aspect, the method further comprises providing a plurality of the vehicle tracking devices arranged in a network and wherein a first vehicle tracking device of the plurality of vehicle tracking devices, in use, transmits the current kinematic data determined at the first vehicle tracking device and unique identification data of the one or more vehicles to a second vehicle tracking device of the plurality of tracking devices and the first vehicle tracking device, in use, receives current kinematic data determined at a third vehicle tracking device of the plurality of vehicle tracking devices and unique identification data of the one or more vehicles from the third vehicle tracking device; the method further comprising: receiving at a local communications device local data from one or more of the plurality of vehicle tracking devices; and transmitting the local data to a remotely-located device via a wide area communications network; wherein the one or more of the plurality of vehicle tracking devices, in use, receives local data from at least one of the one or more vehicles and, in use, transmits the received local data to the local communications device. The transmitting step may comprise transmitting the determined kinematic data to a remotely-located Traffic Management System (TMS).

The above-described features of the embodiments are combinable in different ways and can be added to the following specific description of the embodiments of the present invention if not specifically described therein. For example, the further optional features which have been described above in relation to the embodiment in accordance with the first and second aspects of the invention in which the remote communications device comprises a remote data receiver and a remote data transmitter can just as equally be used with the embodiment described above in accordance with the third and fourth aspects of the invention in which the local communications device comprises a local data receiver and a local data transmitter.

BRIEF DESCRIPTION OF THE DRAWINGS

In order that the invention may be more readily understood, reference will now be made, by way of example, to the accompanying drawings in which.

DETAILED DESCRIPTION

Specific embodiments are now described with reference to the appended figures.

It is to be appreciated that references made herein to a vehicle to be tracked may refer to a variety of mobile mechanical objects, including objects which travel along the ground and in the air. By way of a non-exhaustive list, these vehicles may include cars, lorries, motorcycles, drones, and small aircraft. These vehicles may additionally be configured to be operated manually by a user, or the vehicles may be configured to be autonomous, or a combination of the two, namely semi-autonomous.

Figure 1:
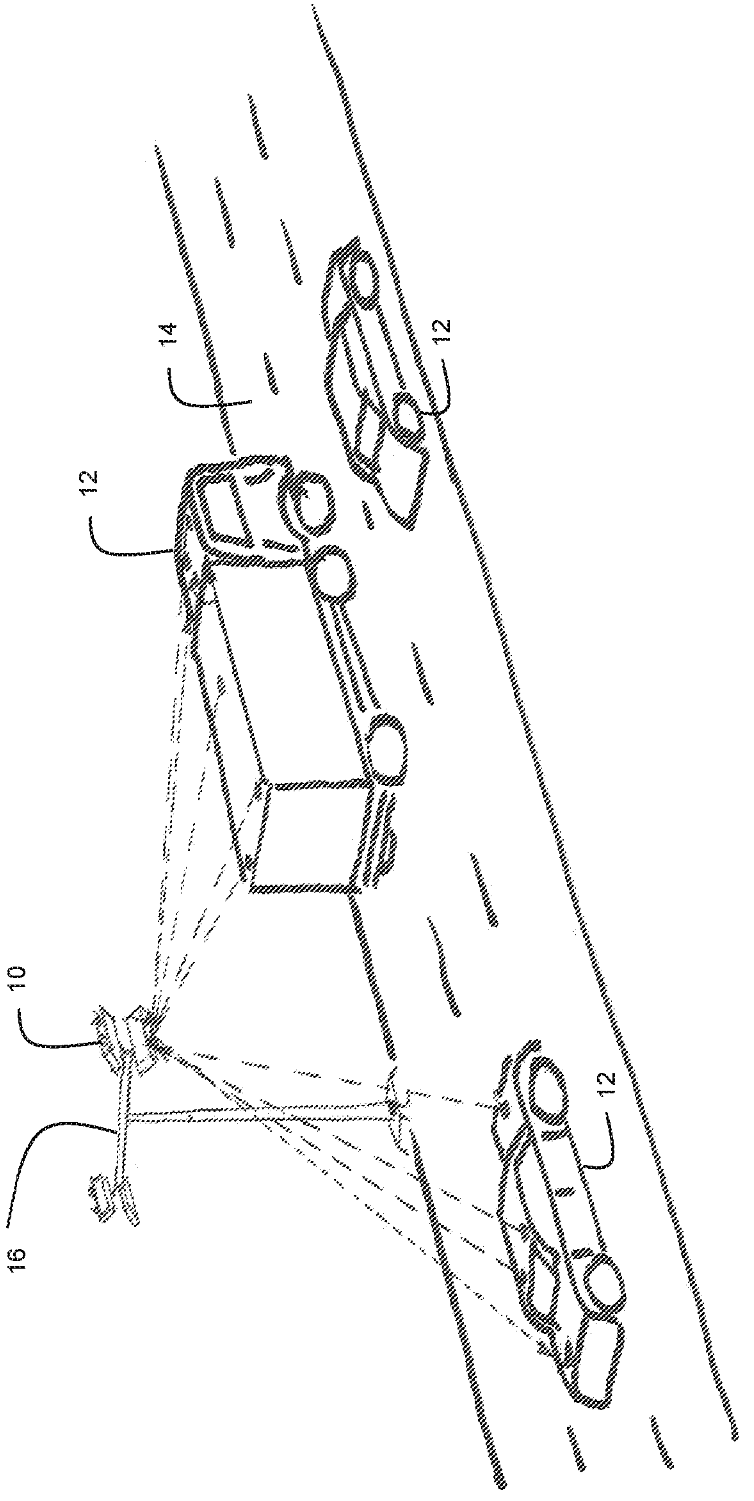
FIG. 1 is an isometric view of a vehicle tracking apparatus in a use scenario.

Turning firstly to FIG. 1, there is shown a vehicle tracking apparatus 10 for detecting one or more vehicles 12 and determining various kinematic data in respect of the detected vehicles 12. Whilst the term apparatus is used throughout this document, it is to be appreciated that this term is to be interpreted as being synonymous to a "device." The vehicle tracking apparatus 10 is shown placed above a road 14 securely mounted on existing road infrastructure 16 and is configured to be arranged to monitor vehicles 12 which enter the fixed field of view of the vehicle tracking apparatus 10. The existing road infrastructure 16 to which the vehicle tracking apparatus 10 may comprise lampposts, traffic lights, gantries, traffic monitoring equipment and bridges. It is to be appreciated that this is an illustrative example and the vehicle tracking apparatus 10 may be mounted to other existing road infrastructure 16. Alternatively, the vehicle tracking apparatus 10 may be provided with dedicated support structures to which the vehicle tracking apparatus 10 may be attached.

The vehicle tracking apparatus 10 is configured to receive data which uniquely identifies the vehicles 12 that enter its field of view. Such unique identification data may comprise a vehicle registration of the vehicle. The vehicle tracking apparatus 10 is additionally configured to receive data indicating an initial position of the vehicle 12 either relative to itself or as an absolute position, as it enters its field of view of the vehicle tracking apparatus 10. Alternatively, all these positions could simply be provided as absolute coordinates such as the latitude and the longitude of the vehicle. The vehicle tracking apparatus 10 is then further configured to use the received unique identification data in conjunction with the initial position data in order to associate the unique identification data with the initial position data. Further details explaining how this may be achieved are given below with reference to FIG. 3.

It is to be appreciated that the term 'initial position' as used throughout this document refers to the position the vehicle 10 is situated at when it first comes into functional view of a vehicle tracking apparatus 10. In addition, in embodiments in which a plurality of vehicle tracking apparatuses 10 are used in a networked system (as described below), the initial position of the vehicle, which is received by the current vehicle tracking apparatus, may be the last tracked position of the vehicle in the field of view of an adjacent vehicle tracking apparatus from which the vehicle is exiting. Given that the fields of view of two vehicle tracking apparatus are typically abutting or slightly overlapping each other, the last sensed vehicle position in a field of view of a first vehicle tracking apparatus can provide a very good indicator of the position the vehicle 10 is situated at when it enters the field of view of a second adjacent vehicle tracking apparatus 10.

The vehicle tracking apparatus 10 is further configured to receive IR emissions, which are either emitted or reflected by vehicles 12 which enter the field of view of the vehicle tracking apparatus 10. The vehicle tracking apparatus 10 is configured to determine various kinematic data of the vehicles 12 based upon the received IR emissions. Such kinematic data may comprise a position, a velocity, an acceleration, or other kinematic properties of the vehicles 12. In some embodiments, the kinematic data determined by the vehicle tracking apparatus 10 is used in conjunction with the unique identifier data and initial position data in order to associate the received data with the detected IR emissions.

Once a vehicle 12 has entered the field of view of the vehicle tracking apparatus 10, the vehicle tracking apparatus 10 may be configured to constantly monitor current kinematic data of the vehicle 12 until such a time as it leaves the field of view of the vehicle tracking apparatus 10. As such, once a vehicle 12 enters the field of view of the vehicle tracking apparatus 10 and the unique identifier information and initial position data are received, the vehicle tracking apparatus 10 is configured to specifically monitor incremental movements of the vehicle 12 by receiving consecutive IR emissions from the vehicle at regular time intervals. Each of the detected IR emissions can be used by the vehicle tracking apparatus 10 to determine a position of the vehicle, and the combination of successive position determinations allows the calculation of other kinematic data such as velocity and acceleration. The measurement of the position at regular time intervals may also be used to determine if a detected vehicle 12 is moving transversely (i.e. changing lanes) as well as longitudinally (i.e. along the road). The length of the time intervals between consecutive detected IR emissions may be used to determine the latency and accuracy of the kinematic data that is calculated. For example, if IR emissions are detected to an accuracy of 5 cm with a periodicity of 20 ms (a frequency of approximately 50 Hz), this translates to a measurement every 50 cm of travel by a vehicle travelling at 100 Km/h. This is considered to be highly accurate for the purposes of vehicle control and navigation and will also enable vehicle velocity, acceleration/deceleration rates, or other useful kinematic data to be calculated quickly and accurately. These figures should be considered as illustrative only since if less demanding accuracies and latencies prove adequate in practice then they can be substituted and if more demanding accuracies and latencies prove necessary in practice they can be substituted.

The vehicle tracking apparatus 10 may be further configured to transmit the determined current kinematic data to the one or more detected vehicles 12. The transmitted kinematic data may comprise any one of the kinematic data determinations made by the vehicle tracking apparatus 10. The provision of the kinematic data enables the one or more detected vehicles 12 to adjust a kinematic quantity (for example speed, or direction of travel) of the relevant vehicle 12 in accordance with the received kinematic information. In some embodiments, the vehicle tracking apparatus 10 is configured to only transmit determined current kinematic data relating to the vehicle 12 it relates to. In such an embodiment, the vehicle 12 is then able to adjust kinematic quantities based on this knowledge (e.g. to reduce or increase velocity, to move within a lane if it is indicated that vehicle is straying into a different lane etc). In further embodiments, the vehicle tracking apparatus 10 is configured to transmit determined kinematic data relating to a plurality of the detected vehicles 12 to each vehicle. In such an embodiment, each vehicle 12 then may adjust kinematic qualities both with knowledge of the vehicle's 12 own kinematic data, as well as the kinematic data of other vehicles 12 in the vicinity. By way of example, a first vehicle 12 is provided with current kinematic data indicating that the velocity and position of second vehicle 12 directly in front of the first vehicle, such that it is possible for the first vehicle to safely move closer to the second vehicle 12.

The current kinematic data is transmitted to one or more vehicles 12 which may be either partially or entirely autonomously operated or may be operated with input from a driver or pilot or remote controller of the vehicle 12. The format of the transmission made by the vehicle tracking apparatus 10 may be arranged to suitably meet the needs of the recipient vehicle 12. In further embodiments of the present invention, the vehicle tracking apparatus 10 is configured to additionally send a control signal to the one or more vehicles 12, causing the vehicle to take a particular action. The control signal may be formed on the basis of the calculated current kinematic data of the one or more vehicles 12. By way of example, if it is determined that two detected vehicles 12 in the field of view of the vehicle tracking apparatus 10 are within a predetermined distance of one another based upon the calculated velocities of the two vehicles 12, the vehicle tracking apparatus 10 generates a control signal to be transmitted to one of the vehicles 12 informing the vehicle to either speed up or slow down accordingly.

In additional embodiments, the vehicle tracking system 10 is also configured to transmit determined current kinematic data to local or regional Traffic Management Systems (TMSs) to provide a shared, common picture comprising the high-accuracy kinematic data for vehicles 12 across a wider field spanning multiple IR tracking sensors. This provides the TMSs with live, accurate data for each vehicle 12 and allows the TMSs to augment the determined current kinematic data provided to the one or more vehicles 12 about their immediate locality with advisory or compulsory information that the on-board systems of the one or more vehicles 12 deal with relating to traffic management. That information may be provided to the one or more vehicles 12 via the vehicle tracking system 10 or by any other appropriately configured systems and networks.

It is to be appreciated that the vehicle tracking apparatus 10 may be securely mounted at various heights. The height at which the vehicle tracking apparatus 10 is mounted typically determines the ground envelope within the field of view of the vehicle tracking apparatus 10 i.e., a vehicle tracking apparatus 10 which is mounted at a higher position may have a greater area within its field of view than a vehicle tracking apparatus 10 which is mounted at a lower position. The height at which the vehicle tracking apparatus 10 is mounted therefore will largely depend upon the field of view requirements. Typically, a vehicle tracking apparatus 10 which is mounted at a height of 10 m will need to have a field of view of 140° longitudinally (i.e. along the road) and 50° transversely (i.e. across the road) in order to cover a ground envelope typically associated with a lamppost on a motorway or freeway.

In further embodiments of the vehicle tracking apparatus 10, it is desirable to be able to alter the field of view of the vehicle tracking apparatus 10 in use, perhaps at the time of installation in order to cover the required ground envelope. For example, it may be desirable to move the field of view such that the vehicle tracking apparatus 10 is able to view a different carriageway of a motorway. In such embodiments, the vehicle tracking apparatus 10 is configured to rotate around at least one axis in order to adjust the ground envelope within the field of view, and possibly to have adjustable optics to vary the field of view, thereby providing the apparatus 10 with a variable ground envelope coverage within the field of view. In such embodiments, the apparatus 10 is configured to take into account the current position and orientation of the vehicle tracking apparatus 10 when determining current kinematic data of the one or more vehicles 12.

Where a plurality of vehicles 12 are present in the field of view of the vehicle tracking apparatus 10, the vehicle tracking apparatus 10 may be configured to receive relevant data and IR emissions from, and calculate current kinematic data of each of the vehicles 12 simultaneously, in accordance with embodiments described herein. The vehicle tracking apparatus may also be used to detect IR emissions from entities other than vehicles, for example pedestrians or cyclists or animals, and enhance the ability of the tracking apparatus to support the safe operation of vehicles in environments where pedestrians or cyclists are present legitimately or where pedestrians or animals should not be present. The field of view of the tracking apparatus may extend to cover pavements or walkways adjacent to roadways so that pedestrians/animals can be tracked.

It is envisaged that in some cases, the vehicle tracking apparatus 10 operates in an environment in which not all of the vehicles which pass into its field of view have the capability to either emit or reflect IR radiation to be detected by the vehicle tracking apparatus 10. In such cases, these vehicles may be restricted to a particular, possibly slowest lane(s) by physical barriers, road signage, on-board vehicle lane-tracking control or any combination of these or other methods. It is further envisaged that in some situations one vehicle may obscure the IR emissions or reflections from another vehicle—for example if a small car is travelling behind and close to a large truck as they approach a sensor. In such cases, either the IR sensor can be fixed at a greater height or the traffic flows can be restricted by traditional means to keep similar sized vehicles in appropriate lanes. Further, a vehicle tracking apparatus 10 may be configured to receive IR emissions from multiple angles, such that IR emissions may still be received even where at certain angles the emissions are blocked from view of the vehicle tracking apparatus 10. In this regard, the vehicle tracking apparatus may comprise a plurality of different IR sensors located at different positions, for example at different heights. In such embodiments, where emissions are detected from multiple angles, the vehicle tracking apparatus 10 may be configured to compare the detected emissions to verify the veracity of the emissions.

Figure 2:
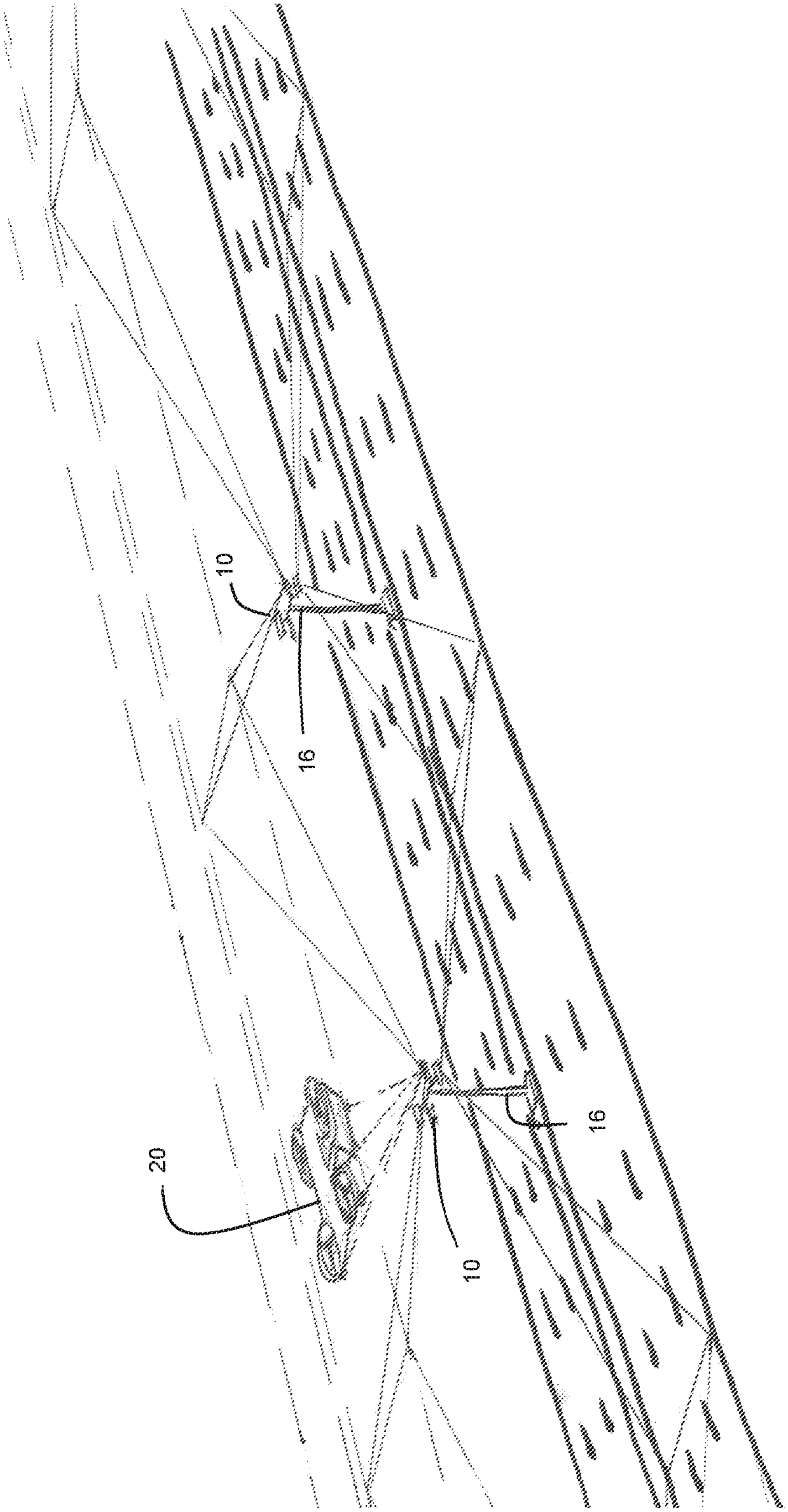
FIG. 2 is an isometric view of the vehicle tracking apparatus of FIG. 1 in an alternate use scenario.

Referring now to FIG. 2, there is shown an alternate use scenario for the vehicle tracking apparatus 10 described in FIG. 1. In this embodiment, the vehicle tracking apparatus 10 is shown mounted on existing road infrastructure. However, in this scenario, the vehicle tracking apparatus 10 is configured to monitor airborne vehicles 20. It is to be appreciated that embodiments described above may be suitably adapted in order to monitor airborne vehicles rather than ground-based vehicles. The tracking apparatus, in other embodiments, may also be mounted on vehicles, for example ships, trains, aircraft or spacecraft, so that other vehicles, for example other aircraft or airborne drones or other spacecraft can be tracked in an accurate manner thereby supporting complex operations such as aircraft landing on ships, drones landing on trains or spacecraft docking operations. Further discussions of how vehicle tracking apparatus can be mounted to existing road infrastructure are given below.

It is to be appreciated that in the use scenario of FIG. 1, the vehicle tracking apparatus is configured to monitor ground-based vehicles 12 which are generally restricted to travel along predefined paths (i.e. roads in cities, countryside and motorways). In the use scenario of FIG. 2 however, the airborne vehicles 20 which are to be monitored are not physically restricted in such a manner, and as such it is envisaged that it may be necessary to mount the vehicle tracking apparatus 10 in places outside of purely road-based infrastructure. Therefore, in use scenarios as illustrated in FIG. 2, the vehicle tracking apparatus 10 is configured to be securely mounted on any existing infrastructure, regardless of its proximity to a roadside. Alternatively, the vehicle tracking apparatus 10 may also be provided with dedicated support structures to which the vehicle tracking apparatus 10 may be attached. Additional considerations regarding such arrangements will be discussed in further detail with reference to FIG. 4. Whilst it is envisaged that it will be possible to mount the vehicle tracking apparatus 10 for monitoring airborne vehicles 20 in places outside of purely road-based infrastructure, it is to be appreciated that airborne vehicles 20 may also still be configured to travel along existing road and rail infrastructure in a manner analogous to that of the ground-based vehicle 12 example. As a result, even when monitoring airborne vehicles 20, the vehicle tracking apparatus 10 may still be configured to be mounted to the same existing roadside/rail-side infrastructure as described previously.

Whilst the use scenarios of FIGS. 1 and 2 are shown separately, it is to be appreciated that a single vehicle tracking apparatus 10 may be provided which is configured to monitor both ground-based 12 and airborne vehicles 20. This is achieved by providing sensors, which are oriented in different directions (namely having different fields of view) to monitor the two types of vehicle. In such scenarios, the vehicle tracking apparatus 10 is configured to only send determined current kinematic data regarding airborne vehicles 20 to the one or more airborne vehicles 20, and similarly is configured to only send determined current kinematic data regarding ground-based vehicles 12 to the one or more ground-based vehicles 12. Additionally or alternatively, the vehicle tracking apparatus 10 may be configured instead to be able to send determined current kinematic data regarding airborne vehicles 20 to one or more ground-based vehicles 12 and vice versa. This advantageously enables ground-based vehicles 12 and airborne vehicles 20 to coordinate their locations. For example, this may be used for ground-to-air battery charging, where airborne vehicles operating under electrical power provided from a battery could dock with a battery recharging truck or train. It may also be used in a use scenario of a delivery lorry or train with a swarm of airborne delivery drones that travel with the lorry or train into the delivery area and then split off, deliver to door, and return. It may further be used in a use scenario where collector drones pick up consignments and deliver to trucks or trains for long-distance transportation. One further advantage of sharing airborne vehicle data with ground-based vehicles and vice versa is that physical spaces can be created in the ground-based vehicles positions above which airborne vehicles can travel. This would be a safety configuration such that if the airborne vehicle were to lose altitude or crash, there would be no ground-based vehicles below the airborne vehicles, which would minimise the risk for collision. It is to be appreciated that these use scenarios are for illustrative purposes only, and it is intended that such an embodiment may be utilised in many other applications. Further details regarding these embodiments are described in further detail with reference to FIG. 4 below.

Figure 3:
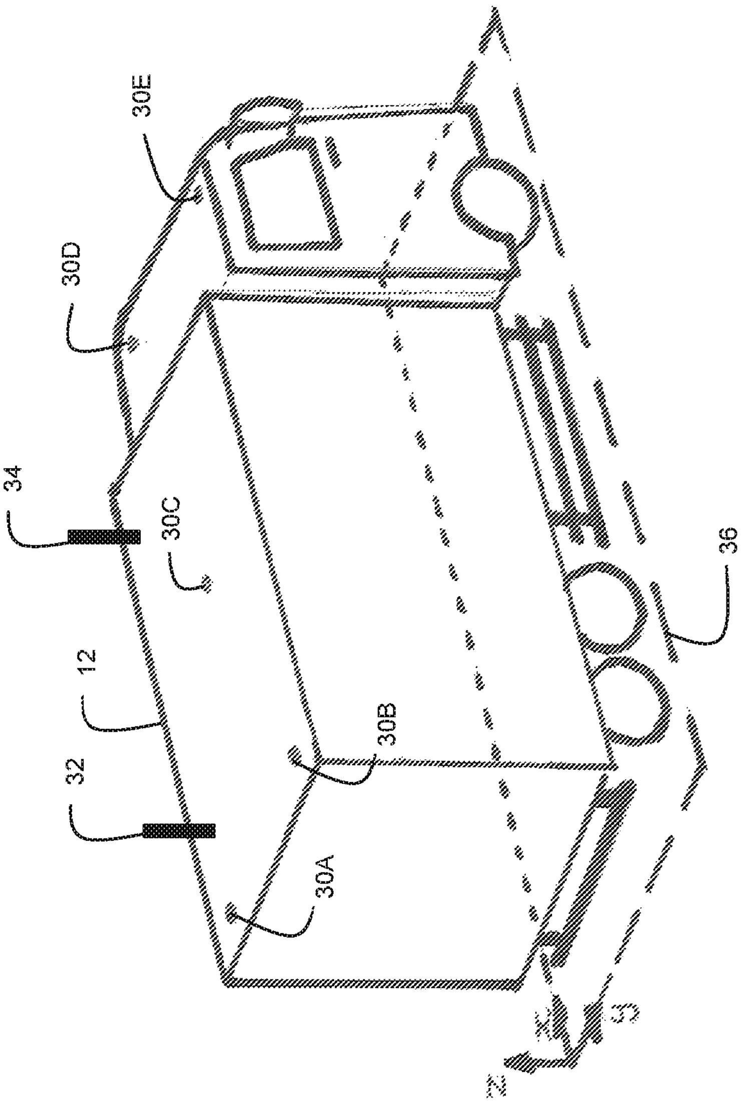
FIG. 3 is an isometric view of a vehicle to be tracked by the vehicle tracking apparatus of FIG. 1.

Turning to FIG. 3, there is shown an example of a ground-based vehicle 12, which the vehicle tracking apparatus 10 of FIG. 1 is configured to detect. FIG. 3 shows a vehicle 12 which is fitted with IR emitters 30A, 30B, 30C, 30D, 30E placed on an upward facing surface of the vehicle 12. Whilst five emitters 30A, 30B, 30C, 30D, 30E are shown in FIG. 3, it is to be appreciated that this is for illustrative purposes only and any suitable number of emitters may be used which enable the functionality of the vehicle tracking apparatus 10. It is also to be appreciated that emitters may be fixed to the front, rear or sides of vehicles. The use of these in relation to a ground space envelope of the vehicle is described later.

The vehicle 12 is also provided with a transmitter 32 and receiver 34 (or a combined transceiver) configured to transmit and receive wireless signals respectively. Upon entering the field of view of a vehicle tracking apparatus 10, the vehicle 12 is configured to transmit a wireless signal to the vehicle tracking apparatus 10. The wireless signal comprises unique identification data of the vehicle 12 as well as the data indicating an initial position of the vehicle 12 with respect to the vehicle tracking apparatus 10 or indicating absolute position of the vehicle. This provision of initial positioning may be particularly useful if the vehicle is unknown to the system, namely at an entry point to the system. However, it is not envisaged that the network of sensors would require this information once the vehicle was being tracked by the system. The information which can be received from the vehicle once known to the network is described below.

The vehicle 12 may typically be configured to transmit data indicating the position of the IR emitters 30A, 30B, 30C, 30D, 30E with respect to a ground-envelope 36 of the vehicle 12. The ground-envelope 36 provides an indication of the two-dimensional footprint of the vehicle representing the space that the vehicle 12 occupies on the road as it is travelling. When IR emissions emitted from the IR emitters 30A, 30B, 30C, 30D, 30E are detected by the vehicle tracking apparatus 10, the emissions may be used in conjunction with the information regarding the ground-space envelope in order to determine the two-dimensional space that the vehicle 12 occupies. In this way, it is not necessary for the vehicle tracking apparatus 10 to fully resolve an image of the vehicle for the purposes of determining in a safe and reliable manner the vehicle's proximity to other vehicles. In some embodiments, the ground-space envelope additionally includes some space surrounding the vehicle to act as a safety zone around the perimeter of space that the vehicle occupies. In addition, the provision of the position of the IR emitters 30A, 30B, 30C, 30D, 30E with respect to the ground-envelope 36 may also help in determining the orientation kinematic data, in which the vehicle tracking apparatus 10 is able to determine the orientation of the relevant vehicle 12 on the road (i.e. whether it is aligned precisely along the road or whether it is angled, so as to change position across the road). In embodiments in which an airborne vehicle 20 is to be tracked, a ground space envelope 36 is not appropriate. In such cases, the airborne vehicles 20 may be configured to provide an air space envelope. In some embodiments, the air space envelope may again provide a two-dimensional footprint of the vehicle representing the two-dimensional space that the vehicle 20 occupies in the air as it is travelling. In further embodiments, the air space envelope may provide a three-dimensional footprint of the vehicle representing the three-dimensional space that the vehicle 20 occupies in the air as it is travelling.

In FIG. 3, the IR emitters 30A, 30B, 30C, 30D, 30E are shown arranged in a particular formation. It is to be appreciated that in addition to the number of IR emitters 30A, 30B, 30C, 30D, 30E being variable, the pattern in which they are arranged in may similarly be variable. In some embodiments of the present invention, the vehicle tracking apparatus 10 is configured to associate a particular pattern of IR emitters with a particular type of vehicle (e.g. lorry, car, drone, motorcycle etc). When a particular spatial pattern of IR emission is detected, the vehicle tracking apparatus 10 is configured to recognise the type of vehicle that is being detected. Such patterns preclude misidentification due to adjacent vehicle coincidences. Standard configurations for particular vehicle types may comprise, for example, a triangular array of 3 IR emitters for cars and a domino array of 5 IR emitters for trucks and vans. These configurations help to enable unambiguous sensing and determination of kinematic data (such as position, velocity, acceleration, deceleration, orientation, etc). Information related to the type of vehicles 12 in the field of view of the vehicle tracking apparatus 10 may also be transmitted to the one or more detected vehicles 12 in the field of view of the tracking apparatus. Furthermore, in embodiments where the vehicle tracking system 10 is configured to generate a control signal, the vehicle tracking apparatus 10 is configured to use information relating to the type of vehicle being detected to determine the content or type of control signal to be generated. For example, when two adjacent vehicles 12 are determined to be in the vicinity of one another, the control signal generated by the vehicle tracking apparatus 10 typically differs for a truck and a car, due to the associated differences in stopping distance.

In some embodiments, the IR emitters 30A, 30B, 30C, 30D, 30E are replaced by IR reflectors. This embodiment is used in cases where the vehicle tracking apparatus 10 is provided with one or more IR emitters which are configured to emit IR radiation into the field of view of the vehicle tracking apparatus 10 and to detect IR radiation which is reflected by IR reflectors on the one or more vehicles 12 in order to track them.

Figure 4:
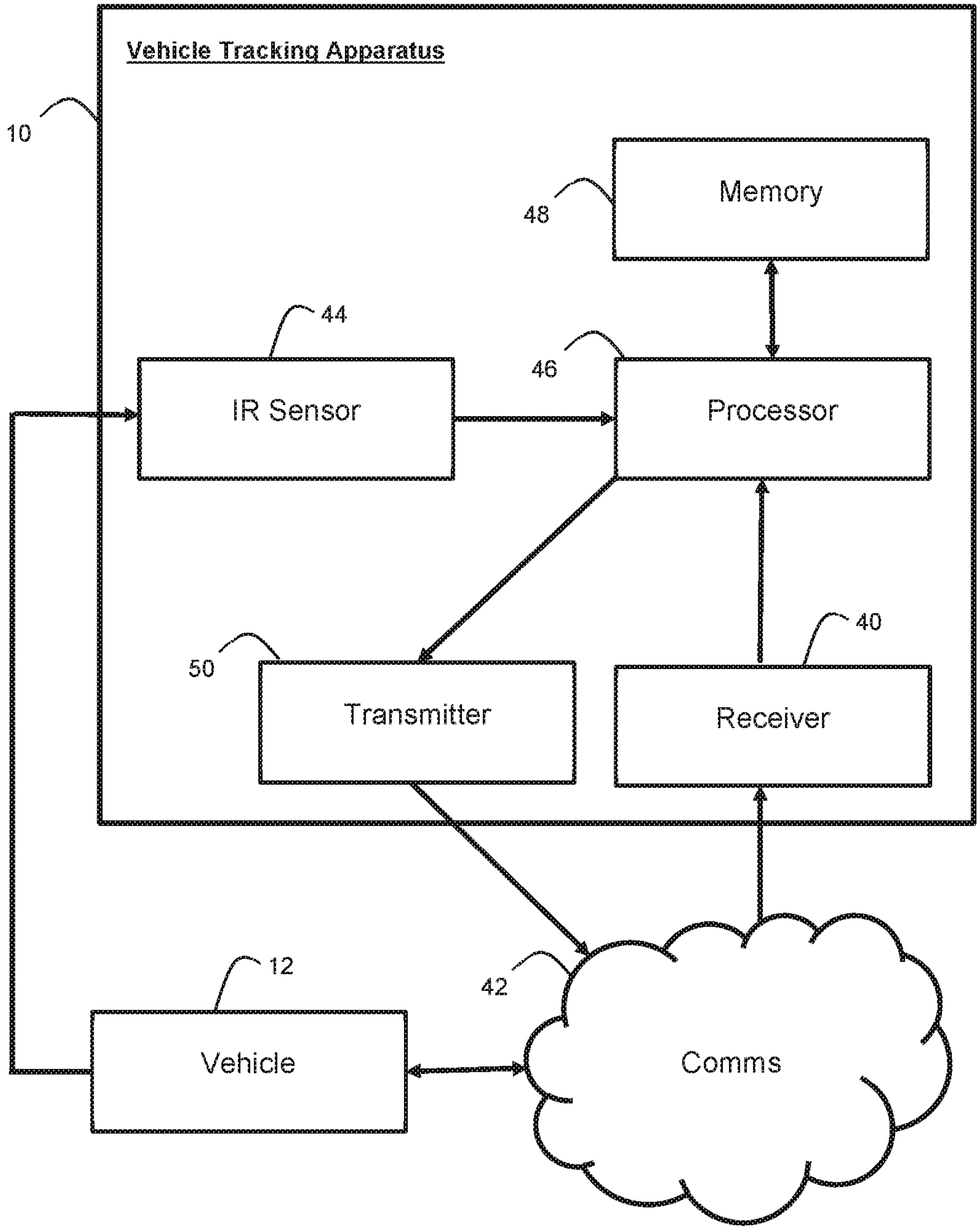
FIG. 4 is a schematic view of the vehicle tracking apparatus of FIG. 1.

Turning to FIG. 4, there is shown in greater detail a schematic view of the vehicle tracking apparatus of FIG. 1. The vehicle tracking apparatus 10 firstly comprises a receiver 40 configured to wirelessly receive transmitted data in accordance with embodiments above. In particular, the receiver 40 is configured to at least receive unique identification data of one or more vehicles 12 in the field of view of the vehicle tracking apparatus 10 and to receive data indicating an initial position of the one or more vehicles 12 relative to the vehicle tracking apparatus 10. The receiver 40 may be configured to wirelessly receive data transmitted from the one or more vehicles 12 via an external communications network 42. The receiver 40 may be configured to receive this data via a low-latency radio frequency communication. Alternatively, the receiver 40 may receive this data using any suitable form of communication, which enables the data to be received from the one or more vehicles 12. In some embodiments, the receiver 40 is additionally configured to receive data originating from sources other than the one or more vehicles 12, such as other vehicle tracking apparatuses 10 or centralised traffic management systems (not shown). Such data is again transmitted via the external communications network 42. In some embodiments, the receiver 40 is configured to receive data through wired communications where appropriate, i.e. where the receiver 40 is configured to receive data from fixed locations (such as a centralised traffic management system or adjacent tracking apparatuses).

In some embodiments of the present invention, the vehicle tracking apparatus 10 is configured to monitor an area or "entry point" whose position is preconfigured to be known to the vehicle tracking apparatus 10 (e.g. by storing this position in a memory 48 of the vehicle tracking apparatus). In such embodiments, it may not be necessary for the vehicle tracking apparatus 10 to receive information from the one or more vehicles 12 regarding an initial position of the one or more vehicles 12. In such embodiments, the vehicle tracking apparatus 10 may be configured such that the initial position of a particular vehicle 12 will always be the position that is preconfigured to be known to the vehicle tracking apparatus 10 as described above. In further embodiments, the vehicle tracking apparatus 10 is configured to monitor several locations in an entry point (e.g. a plurality of lanes), each of these with their own known preconfigured position. In such embodiments, when a vehicle 10 enters an entry point, the vehicle tracking apparatus 10 may be configured to select one of the plurality of preconfigured positions as being the initial position of the vehicle 10. The method by which such a selection may be made is described in further details with reference to the "association" procedure described below. Such an entry point embodiment may manifest at a toll booth, where a vehicle is configured to stop at a particular location which is known by the vehicle tracking apparatus 10. In some embodiments, the vehicle 12 will not need to be stationary when approaching the known location.

In additional or further embodiments, the vehicle tracking apparatus 10 may also be configured to determine unique identification data of one or more vehicles 12 rather than receive it from the respective vehicle 12. This may be achieved by providing the vehicle tracking apparatus 10 with a sensor (not shown in the accompanying figures) which is able to determine a unique identifier of a vehicle 10 (for example, a license plate/number plate of the vehicle) or to identify and classify the vehicle (for example using image processing) and assign a unique identifier for the purpose of monitoring the position of the vehicle more approximately. Such a sensor may comprise an Automatic Number Plate Recognition (ANPR) camera or other suitable camera or sensor which is able to uniquely identify a particular vehicle 10 or to detect and assign a unique identifier. Such embodiments may also be used in combination with embodiments described above where the vehicle tracking apparatus 10 is configured to monitor an area or “entry point” whose position is preconfigured to be known to the vehicle tracking apparatus 10. In such cases, it may not be necessary for the vehicle tracking apparatus 10 to receive any data transmissions from the one or more vehicles 10 whatsoever, with the determination and assignment of initial positions, and determination of unique identification being performed entirely by the vehicle tracking apparatus 10. However, where information relating to ground-space envelopes is also to be received by the vehicle tracking apparatus 10, this may still need to be provided by the respective vehicle 12.

Additionally, the vehicle tracking apparatus 10 may comprise one or more IR sensors 44 configured to detect IR radiation, and specifically to detect IR radiation either being emitted from or reflected by the IR emitters or reflectors 30A, 30B, 30C, 30D, 30E of the one or more vehicles 12 to be tracked in accordance with embodiments described above. In FIG. 4, only one IR sensor 44 is shown, but it is to be appreciated that this is for illustrative purposes only and that in some scenarios, it is beneficial to include a plurality of IR sensors 44. For example, a plurality of IR sensors 44 may be provided, where each IR sensor has a different field of view of a road or perhaps a road intersection which it is directed towards. This enables dedicated IR sensors 44 to be provided for each lane of the road. Alternatively, and in accordance with embodiments described above, multiple IR sensors 44 may be provided, where one or more of the IR sensors 44 are configured to monitor a road, and one or more of the IR sensors 44 are configured to monitor the sky. In this way, a single vehicle tracking apparatus 10 may be configured to monitor both airborne vehicles 20 and ground-based vehicles 12 in accordance with embodiments described above. The same arrangement could apply for example on an aircraft carrier where both aircraft movements on deck and approaching airborne aircraft are being tracked. The IR sensors 44 may be configured to detect IR radiation in a predetermined range of wavelengths, where the predetermined range is decided by a user of the vehicle tracking apparatus 10. In particular, the predetermined range of wavelengths may specifically correspond to a range of wavelengths emitted or reflected by the one or more vehicles 12. This enables the vehicle tracking apparatus 10 to reduce detection of IR noise, which may be emitted by sources other than the one or more vehicles 12 to be tracked.

The vehicle tracking apparatus 10 of the current embodiment, further comprises a processor 46, which is communicably coupled to the receiver 40 and the one or more IR sensors 44. The processor 46 is configured to receive data which is received by the receiver 40 in accordance with embodiments described above, as well as information related to the detected IR emissions received by the one or more IR sensors 44. The processor 46 is further configured to track the one or more vehicles 12 on the basis of the received data and the detected IR emissions. This tracking comprises the calculation of various kinematic data relating to the one or more vehicles 12. In particular, the processor 16 is configured to at least determine a position that the IR emissions originate from. This may be determined, for example, by processing the IR image within the sensor, or by determining an angle that the IR emission has entered the IR sensor 44 at and combining this with known information relating this angle to a particular position on the road. The information received by the processor 46 may comprise any relevant information, which enables the processor to determine a position that the IR emissions originate from (e.g. time that the emissions are received, angle that the IR emissions enters the IR sensor 44 at etc).

The processor 46 is configured to receive the unique identification data of one or more vehicles 12 in the field of view of the vehicle tracking apparatus 10 and to receive data indicating an initial position of the one or more vehicles 12 relative to the vehicle tracking apparatus 10, and to correlate this data with the information related to the detected IR emissions received by the one or more IR sensors 44. In this way, the processor 46 is able to associate a particular IR emission with a unique identifier of the vehicle 12 that emitted or reflected the IR radiation. This correlation may comprise comparing the initial position data received by the receiver 40 with a determined position that the received IR emissions originate from to establish whether the two positions are in agreement. Where the two positions are in agreement, the processor 46 is configured to associate the received IR emissions with unique identifier data of the vehicle 12 whose initial position data agrees with the position of origin of the IR emissions. Upon agreement, the processor 46 may be configured to denote the now identified vehicle 12 as having a particular position in accordance with the initial position data and/or the origin point of the IR emissions. In some embodiments, agreement is determined where the initial position data and the position of the IR emissions lie within a margin of error of one another. In embodiments where a single vehicle is provided with a plurality of IR emitters or reflectors 30A, 30B, 30C, 30D, 30E, the processor 46 is configured to associate the received IR emissions from the plurality of IR emitters or reflectors 30A, 30B, 30C, 30D, 30E with the unique identifier of the vehicle 12 that emitted or reflected the IR radiation. This may be achieved analogously to the above described embodiments, but in addition the received unique identification may comprise initial position data for each of the a plurality of IR emitters or reflectors 30A, 30B, 30C, 30D, 30E and an indication of the total number of IR emitters or reflectors 30A, 30B, 30C, 30D, 30E on the vehicle 12.

In accordance with some embodiments described above, the vehicle tracking apparatus 10 is configured to monitor an area or “entry point” whose position is preconfigured to be known to the vehicle tracking apparatus 10 and which may be utilised as the initial position data for a vehicle 12. As mentioned above, such a position may be stored in a memory 48 of the vehicle tracking apparatus 10. In these embodiments, when the processor 46 associates a detected IR emission with unique identification data, the initial position of the vehicle 12 is assigned as being the preconfigured position known to the vehicle tracking apparatus 10. This position may be retrieved from the memory 48 by the processor 46 accordingly. In further embodiments in which the vehicle tracking apparatus 10 is configured to monitor several locations in an entry point (e.g. a plurality of lanes), each of these with their own known preconfigured position, the processor 46 is configured to determine which of the plurality of preconfigured positions should be assigned as an initial position of the vehicle 12. This may be accomplished by comparing the origin positions of the received IR emissions to each of the preconfigured positions and assigning the initial position based on this comparison. In some embodiments, this assignment is performed when a comparison between the origin positions of the received IR emissions and a preconfigured position lie within a margin of error of one another. In other embodiments, this assignment is performed by comparing all preconfigured positions with the origin positions of the received IR emissions and assigning the initial position as being the preconfigured position which lies closest to the origin positions of the received IR emissions. The above provided examples are provided for illustration only and any suitable comparison method may be performed which achieves the required functionality described above.

Following the association of a vehicle 12 with a particular detected IR emission or emissions in accordance with embodiments described above, the processor 46 is configured to store information related to the association in a memory 48 to which the processor 46 is communicably coupled. The information stored in the memory 48 comprises the unique identifier of the associated vehicle 12 as well as its determined position. The information stored in the memory 48 may additionally comprise any other determined kinematic data in accordance with embodiments described herein. The memory 48 may be configured to be accessed by the processor 46 at a later time to retrieve information related to one or more previously associated vehicles 12. This retrieval may be used to determine other kinematic data of the vehicle or vehicles 12 in accordance with embodiments described herein.

Upon receipt of information related to the detected IR emissions received by the one or more IR sensors 44, the processor 46 may additionally be configured to determine whether the detected IR emissions have been emitted or reflected by a vehicle 12 whose unique identification has previously been associated with detected IR emissions. This is achieved by retrieving from the memory 48 information regarding determined positions of vehicles 12 which have been stored in accordance with embodiments described above and comparing these with the origin position of the currently detected IR emissions. If it is determined that the origin of the current IR emissions is sufficiently close to a previously determined position of a vehicle 12 after a known time interval, the processor 46 is configured to associate the presently detected IR emission with this vehicle and to denote the origin of the presently detected IR emission as a new position of the vehicle 12. The determination of whether the origin is sufficiently close may be achieved by calculating the difference in the position between the origin of the IR position and the previously determined position of the vehicle 12, and where the difference is below a predetermined threshold, the processor 46 associates the origin of the IR emissions as being the new position of the vehicle 12. The predetermined threshold may be set by a user. The predetermined threshold may also be based on other factors, such as a velocity of the vehicle 12 and the refresh rate of the IR sensor 44. This new position may then be stored in the memory 48. In some embodiments, the new position overwrites the previously determined position. In other embodiments, the new position is stored in addition to the previously determined position or positions with a timestamp, creating a record of all positions that the vehicle 12 has been at since it was first detected. In such embodiments, when determining whether subsequent emissions relate to the vehicle 12 record, the origin of the IR emissions is compared with the most recent position of the vehicle 12 in accordance with the timestamp. The processor 46 may be configured to perform this determination as frequently as the IR sensor 44 receives emissions. As noted above, the length of the time intervals between consecutive detected IR emissions may be used to determine the accuracy of the kinematic data which is calculated. For example, if IR emissions are detected with a periodicity of 8 ms (a frequency of approximately 120 Hz), this translates to a 20 cm distance of travel by the vehicle. This is considered to be highly accurate for the purposes of vehicle control and navigation and also enables vehicle velocity, acceleration/deceleration rates, or other useful kinematic data to be calculated quickly and accurately. These figures should be considered as illustrative only since if less demanding accuracies and latencies prove adequate in practice then they can be substituted and if more demanding accuracies and latencies prove necessary in practice they can be substituted.

The processor 46 may additionally be configured to retrieve information from the memory 48 in relation to a particular vehicle in order to calculate additional kinematic data of the vehicle 12. In particular, the processor may be configured to retrieve a plurality of positions of a particular vehicle 12 and their associated timestamps (known as a vehicle track record over a period of time) in order to calculate a velocity and/or an acceleration of the vehicle 12. The velocity and acceleration may be calculated in two dimensions (i.e. along the road and across the road). The calculation may be performed in accordance with techniques known to the person skilled in the field and so do not need to be described further here. By calculating this additional kinematic data, more information may be determined regarding the vehicle 12, which may additionally be used for more accurate control of the vehicle 12 when the information is provided to the vehicle 12. The calculated kinematic data may additionally be stored in the memory record of the relevant vehicle 12.

In further embodiments of the present invention, the processor 46 is configured to additionally generate a control or warning signal to be enacted by the one or more vehicles 12, causing the vehicle to take a particular action. The control signal may be formed on the basis of the calculated current kinematic data of the one or more vehicles 12 in accordance with the embodiments above. In such embodiments, the processor 46 is configured to retrieve kinematic data from the memory 48 for all vehicles 12 in the field of view of the tracking apparatus 10 in order to determine an action to be taken. By way of example, if it is determined that two detected vehicles 12 in the field of view of the vehicle tracking apparatus 10 are within a predetermined distance of one another based upon the calculated velocities of the two vehicles 12, the processor 46 generates a control or warning signal to be transmitted to one of the vehicles 12 telling the vehicle to either speed up or slow down accordingly.

In some embodiments, when a vehicle 12 moves out of the field of view of the vehicle tracking apparatus 10, the processor 46 is configured to instruct the memory to delete any stored information relating to the vehicle 12.

In embodiments in which the vehicle tracking apparatus 10 is configured to receive information indicating the position of the IR emitters 30A, 30B, 30C, 30D, 30E with respect to a ground-envelope 36 of the vehicle 12, the processor 46 may be additionally be configured to combine this information with the information related to the detected IR emissions received by the one or more IR sensors 44 to determine a position/orientation of the ground envelope 36 of the vehicle 12. In some embodiments, the position of the ground envelope 36 is determined relative to the vehicle tracking apparatus 12 and/or is determined as an absolute position of the ground envelope 36.

In these embodiments, where the vehicle 12 that the ground envelope 36 relates to has not previously been associated, the calculation of the position of the ground envelope 36 is performed as part of the initial association step. When the correlation of the detected IR emissions and the unique identification data of a vehicle 12 is performed to indicate an initial position of the vehicle 12, the processor 46 will additionally combine the initial position data of each of the IR emitters 30A, 30B, 30C, 30D, 30E with the information regarding the position of each of the IR emitters 30A, 30B, 30C, 30D, 30E with respect to the ground envelope 36. In this manner, the initial position of the ground envelope 36 is generated and an indication of the two-dimensional space that the vehicle 12 initially occupies is generated without requiring an image of the vehicle 12 to be fully resolved. As described in above embodiments, the ground space envelope may additionally include some space surrounding the vehicle to act as a safety zone around the perimeter of space that the vehicle 12 occupies. Once the initial ground envelope 36 position is determined, this information is stored in memory 48 analogously to the procedure described above regarding the initial positions of the IR emitters 30A, 30B, 30C, 30D, 30E, in addition to the ground space envelope 36 information which has been provided regarding the position of the IR emitters 30A, 30B, 30C, 30D, 30E relative to the ground space envelope 36.

Where the ground envelope 36 is to be calculated for a vehicle 12 whose unique identification has already been associated in accordance with embodiments described above, the processor 46 may additionally retrieve the stored ground envelope 36 information from the memory 48. When it is determined that the IR emissions relates to a vehicle 12 that has previously been associated, the processor 46 will retrieve information regarding the position of the IR emitters 30A, 30B, 30C, 30D, 30E relative to the ground space envelope 36 which has previously been stored. This information may then be combined with the detected origin points of the IR emitters 30A, 30B, 30C, 30D, 30E in an analogous manner to the above. Similarly, any calculated new position of the ground envelope 36 may similarly be stored in the memory 48 along with the positions of the IR emitters 30A, 30B, 30C, 30D, 30E and any associated time stamps.

Whilst a position/orientation of a ground space envelope 36 has been discussed as being calculated, it is to be appreciated that other kinematic data (such as velocity and acceleration) may be equally calculated in respect of the ground space envelope 36 of the vehicle 12 and subsequently stored in the memory 48. Furthermore, any of the functionality of the vehicle tracking apparatus 10 described herein which relates to the ground space envelope is also applicable to an air space envelope for airborne vehicles.

The vehicle tracking apparatus 10 may additionally comprise a transmitter 50 which is communicably coupled to the processor 46. The transmitter 50 may be configured to receive the determined kinematic data from the processor 46 and subsequently transmit this to one or more vehicles 12 in the field of view of the vehicle tracking apparatus 10. The transmitter 50 may be configured to transmit this data via a low-latency radio frequency communication. Alternatively, the transmitter 50 may transmit this data using any suitable form of communication, which enables the data to be received by the one or more vehicles 12.

The transmitter 50 may be configured to transmit the determined kinematic data of a vehicle 12 only to the vehicle 12 that it relates to. In such embodiments, the data is received by the vehicle in order to self-regulate a position and/or velocity of the vehicle 12 based on only its own kinematic data. To this end, each vehicle 12 may have a unique, or locally unique, communication frequency through which it may transmit and receive data. This information may be provided as part of the unique identification data in accordance with embodiments described above. In some embodiments, the communications channel may be encrypted in order to prevent unauthorised interception of or interference with the transmissions.

In further embodiments, the transmitter 50 is configured to transmit determined kinematic data of one or more vehicles 12 to a plurality of the one or more vehicles 12. The data may be transmitted in accordance with embodiments described above. In such embodiments, the data is received by the vehicle in order to self-regulate a position, velocity and/or acceleration of the vehicle 12 based on its own kinematic data as well as the kinematic data of vehicles 12 in its vicinity. For example, a vehicle 12 may be configured to receive kinematic data relating to itself as well as that of the vehicles around it, and based on all of this information, the acceleration or velocity and hence position of the vehicle 12 is adjusted accordingly (e.g. if it is noted that another vehicle in the vicinity is further away than a particular threshold distance, the vehicle 12 is configured to adjust its own position to close this distance, or vice versa).

Where kinematic data is transmitted in accordance with the above, in embodiments where a ground space envelope 36 position of the vehicle 12 (and any other associated kinematic data) is calculated, this kinematic data may equally be transmitted in an analogous manner.

In embodiments where the processor 46 generates a control or warning signal, the transmitter 50 is additionally configured to transmit the generated control or warning signal to the one or more vehicles 12. In this embodiment, the transmitter 50 is configured to only transmit the control or warning signal to the vehicle 12 to which it relates. This may be achieved analogously to the way in which kinematic data may only be transmitted to the vehicle 12 to which it relates as described above.

In embodiments in which a control signal or warning is generated and kinematic information regarding a ground space envelope 36 of one or more vehicles 12 is provided and/or calculated, the control signal or warning may be generated based on the kinematic information of the ground space envelope 36. As previously discussed, the ground space envelope 36 of a vehicle may be provided with a safety zone around the perimeter of space that the vehicle 12 occupies. By basing a control signal or warning on the basis of the kinematic data of the ground space envelope 36, this safety zone is taken into account. This may act so as to offer an additional safety mechanism to the system such that the one or more vehicles 12 are maintained at a safe proximity to one another. This may be particularly advantageous in mitigating against small positional determination errors of the one or more vehicles 12.

The transmitter 50 may also be configured to transmit determined current kinematic data to local or regional Traffic Management Systems (TMSs) to provide a shared, common picture comprising the high accuracy kinematic data for vehicles 12 across a wider field spanning multiple IR tracking sensors. The advantages of such a transmission are described above. The receiver 40 may also be configured to receive control, warning or advisory information from local or regional TMSs and pass it on to the vehicles 12 via the transmitter 50. Alternatively, the TMSs may provide control, warning or advisory information to the vehicles 12 by some other appropriately configured mechanism.

Where the receiver 40 is configured to receive data from the vehicles 12, the vehicle tracking apparatus may further be configured to constantly generate a request signal for this data which is to be transmitted by the transmitter 50 to the one or more vehicles 12 which requests the required data as the vehicle enters the field of view of the vehicle tracking apparatus 10. Alternatively, the vehicles 12 may also be configured to simply continually broadcast this information to be received by the vehicle tracking apparatus 10 as the vehicle 12 comes within range.

In further embodiments of the vehicle tracking apparatus 10, there are additionally provided one or more IR emitters (not shown). These IR emitters may be provided in scenarios in which each of the one or more vehicles 12 to be detected comprises one or more IR reflectors rather than emitters. In such embodiments, the IR emitter of the vehicle tracking apparatus 10 is configured to emit IR radiation in the direction of the vehicles 12 to be detected, which is then reflected by the IR reflectors of the vehicle 12, to be detected again by the vehicle tracking apparatus 10. This detected IR radiation may then be used again in accordance with the embodiments described above.

In further embodiments, the vehicle tracking apparatus 10 additionally comprises an additional fixed IR emitter or reflector (not shown) that is located remotely from the IR sensors 44 and is constantly in the field of view of the IR sensors. The IR sensors 44 continuously monitor the position of this fixed emitter/reflector and use any detected offset from the fixed position to measure any movement of the other elements of the vehicle tracking apparatus 10 due to environmental conditions (such as wind). The processor 46 is configured to calculate this offset based on the received IR emissions from the fixed IR reflector or emitter. Where any offset is calculated, this can be used to feed into the kinematic data calculations for both ground-based and airborne vehicles to maintain tracking accuracy. This is particularly advantageous where adverse weather conditions which lead to movement of the vehicle tracking apparatus 10 is to be expected and helps to prevent the inaccurate calculation of kinematic data.

In some embodiments of the vehicle tracking apparatus 10, the processor 46 is additionally configured to calculate kinematic data in three dimensions. In such embodiments, the vehicle tracking apparatus 10 is additionally configured to receive via the receiver 40, or have previously stored in memory 48, three-dimensional terrain mapping data which is used to correlate a particular detected two-dimensional position with a height of the terrain at that point. This three-dimensional positional data is stored and used in calculations analogously to the two-dimensional data described above. Where the vehicle tracking apparatus 10 is configured to detect and track airborne vehicles, the vehicle tracking apparatus 10 is also configured to receive altitude data from the airborne vehicle in order to ascertain three-dimensional positional data. This can be assumed by the current embodiment of the present invention due to the general availability of small, low-power, low-weight radar altimeters which have performance characteristics (60 Hz measurement rate, 20 cm accuracy) compatible with the current embodiment. Alternatively, horizontal, 360 degree laser beacons may be deployed on fixed structures at the appropriate height (for example on the top of tall buildings in an urban area, to provide an altitude homing reference signal for airborne vehicles. Alternatively, the vehicle tracking apparatus 10 may be configured to receive a plurality of emissions from a plurality of sensors on an airborne vehicle in order to perform a triangulation operation, which enables three-dimensional positional data to be ascertained. With a combination of these and possibly other methods height hold can be maintained by airborne vehicles to the required safety level.

Examples of required receipt and transmission rates and data requirements in order to maintain an accurate calculation are discussed below. It is to be appreciated that these are given by way of example only, and exact figures may be dependent upon the requirements of the user.

Typical current advisory separations between road vehicles travelling at 100 km/h are based on stopping distance being the sum of thinking distance and braking distance in the ratio of 1:3. The current embodiments of the present invention may enable the elimination of thinking distance thereby immediately increasing safe traffic flow rates by 25%. It will be possible progressively to increase this envelope as confidence in the safety of the system and methods develops, to at least double and potentially multiples of current traffic flow rates. Comparable considerations exist for rail traffic where separation minima between trains largely determine network capacity. The current embodiments of the present invention may enable reductions in separation minima.

On a typical motorway/freeway the separation between lampposts to which a vehicle tracking apparatus 10 may be attached is approximately 30 metres (m), the height of a lamppost is approximately 10 m and the width of a carriageway is approximately 11 m, all of which requires the vehicle tracking apparatus 10 to have a field of view of typically 140° longitudinally (along the carriageway) and 55° transversely (across the carriageway). The vehicle tracking apparatus 10 can be produced in a standard configuration with settings that can be adjusted at installation for the longitudinal and transverse field of view, thus allowing a standard vehicle tracking apparatus 10 of the above described embodiments to be deployed in a wide variety of situations. The vehicle tracking apparatus 10 resolves all of the multiplicity of vehicles within its field of view. For a 3-lane carriageway this could be up to around twenty small vehicles 12, assuming they are all cars travelling with only 1 m nose-to-tail separation (a limiting case which may be achieved only after progressively deploying and proving the system with gradually increasing traffic densities). In this limiting case, around 60 IR emitters/reflectors of the vehicles 12 will be in view and it is considered practical to resolve and analyse this number to create and communicate kinematic data for each vehicle 12.

IR radiation emitted by typical commercially available beacons has strong characteristics through normal atmosphere and weather at the distances proposed with the system and methods of the embodiments of the present invention. With the vehicle tracking apparatus 10 being arranged at a height of around 10 m and a field of view of around 140 by 55 degrees, a focal plane array CCD detector of around 4 megapixels, i.e. 2K×2K pixels, will give a bearing accuracy of approximately 0.1 degrees, achieving the resolution of around 5 cm and able to track up to twenty vehicles 12=60 IR emitters (this is the maximum vehicle occupancy within the field of view, based on all being small cars with a longitudinal separation of 1 m). A detection refresh rate of around 100 Hz is required in order to track vehicles to the require accuracy at speeds up to 200 kph. These parameters are at or approaching those that can be achieved by the latest technology IR tracking sensors (which is improving year on year).

A 2D positional accuracy of approximately 5 cm×5 cm in a field of view 30 m×11 m requires 18 bits of digital data; hence, for the limiting case of 20 small vehicles 12 (=60 emitters) each with a longitudinal/transverse location of 18 bits, equates to 1080 bits. At 120 Hz, this will generate a 110 Kbit/sec data-stream, which is passed through the communication equipment to the vehicle 12. For short distance transmission back down to the vehicles' antennae within the field of view, this is practical and an encryption device or method (not shown) can be added for extra security.

It is envisaged that the means of transmitting data between a vehicle tracking apparatus 10 and vehicles 12 could be any one of a number of wireless communication systems or technologies capable of transmitting the required data (estimated in the example above as 1080 bits) with a latency of around 1-2 ms. For example, it could be an integral part or 'network slice' of the evolving 5G digital mid or high band network technologies which have air latencies of <1 ms and ranges of around, or at least, 10 m and hence fit within the performance and design envelope of the current invention. Alternatively, the data transmission may be by means of standard 802.11 WiFi wireless network the latest versions of which meet the desired latency and capacity requirements of the current invention, or it may be a new infrastructure system that meets the new 802.11p standard for fast moving mobile communications for vehicle-to-vehicle and vehicle-to-infrastructure networks to be used to support autonomous, semi-autonomous and managed autonomous driving, Further alternatively, it may be a dedicated, designed for the purpose, datalink. It is also envisaged that the means of transmitting data between a vehicle tracking apparatus 10 and vehicles 12 could be an integral part of the 5G/6G digital small-cell network technology which will have air latencies of <1 ms and ranges from around 10 ml and hence fit within the performance and design envelope of the current invention. Indeed, embodiments of the present invention may be the critical enabler for the envisioned vehicle-to-vehicle and vehicle-to-infrastructure networks to be used to support autonomous, semi-autonomous and managed autonomous driving.

It is to be appreciated that the above described embodiments may be used in determining and transmitting kinematic data for both ground-based and airborne vehicles where appropriate.

Figure 5A:
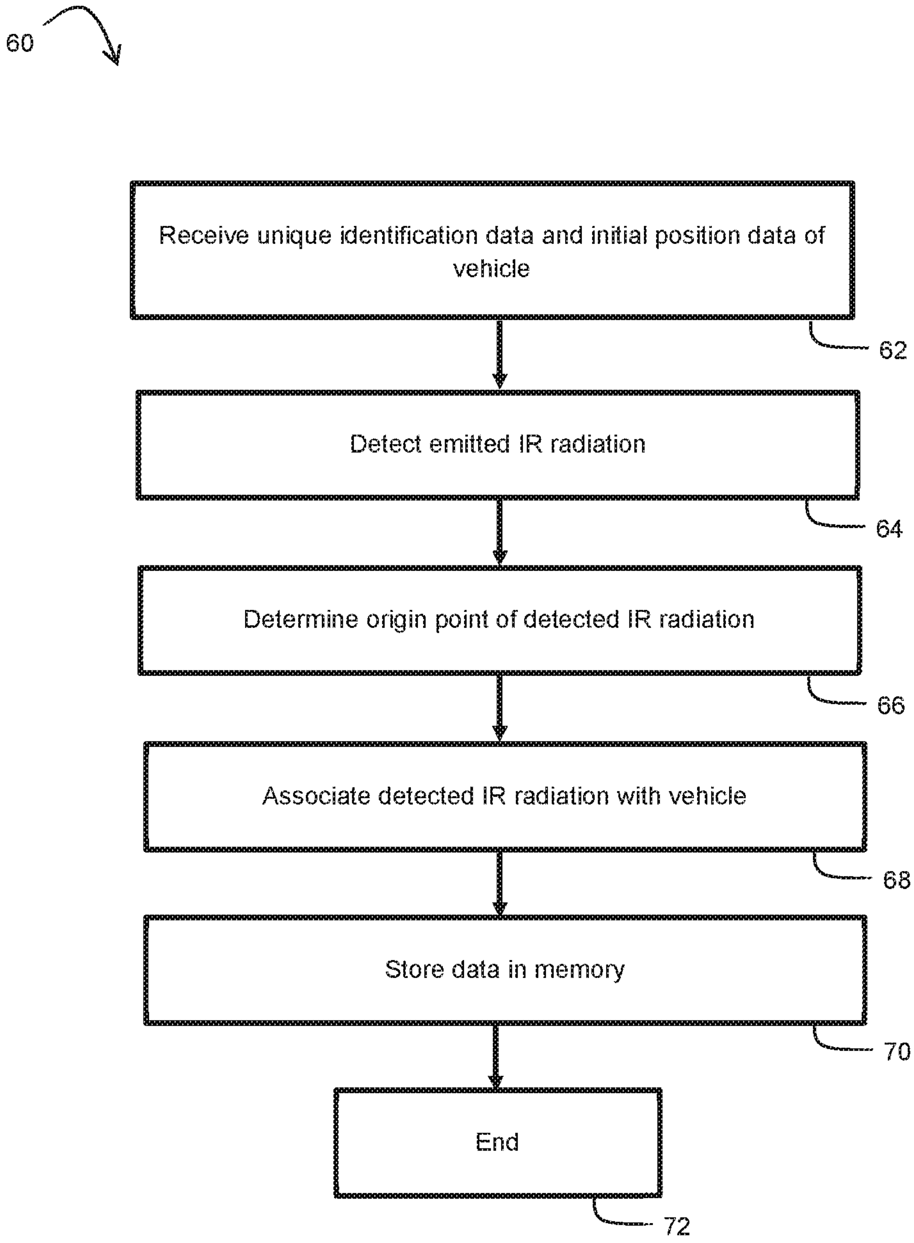
FIG. 5A is a flow diagram illustrating a method of operation of the vehicle tracking apparatus of FIG. 1.

Turning now to FIG. 5A, there is shown a method of operation 60 of the vehicle tracking apparatus 10 described in embodiments above. In particular, FIG. 5A is concerned with the method by which the vehicle tracking apparatus receives unique identification data and associates this with a received IR emission.

The method 60 begins by receiving, at Step 62, transmitted unique identification data of one or more vehicles 12 in the field of view of the vehicle tracking apparatus and transmitted data indicating an initial position of the one or more vehicles 12 relative to the vehicle tracking apparatus 10. Alternatively, this initial position can be provided as absolute position coordinates, for example latitude and longitude coordinates. This data is received by the receiver 40 in accordance with embodiments described above. Following this, the method 60 continues by detecting, at Step 64, IR radiation either being emitted from or reflected by the IR emitters or reflectors 30A, 30B, 30C, 30D, 30E of the one or more vehicles 12 to be tracked in accordance with embodiments described above. The IR radiation is detected by the one or more IR sensors 44. It is to be appreciated that whilst Steps 62 and 64 are shown sequentially, the two transmissions may equally be received in the opposite order, or simultaneously.

Following this, the method 60 continues by determining, at Step 66, the origin point of the detected IR radiation. This may be achieved in accordance with embodiments described above and may be performed by the processor 46. This step enables a position to be associated with the received IR radiation. Following this determination, the vehicle tracking apparatus 10 then proceeds to associate, at Step 68, the received IR emissions with the received unique identification data of one or more vehicles 12. This may be achieved by comparing the determined position of the IR emissions with the received initial position of the vehicle 12, in accordance with embodiments described above. In some embodiments, multiple sets of IR emissions with different origin positions may be received simultaneously. In these embodiments, the method 60 comprises comparing the initial position of the vehicle 12 with each of the sets of IR emissions until a suitable emission is found that the vehicle 12 can be associated with. Once the vehicle 12 has been associated with an IR emission, the method 60 continues by storing, at Step 70, the unique identification data of the vehicle 12 and the initial position of the vehicle 12 in the memory 48, in accordance with embodiments described above. The method then proceeds to end at Step 72.

In the above method 60, there is discussion regarding the association of detected IR emissions with transmitted data indicating an initial position of the one or more vehicles 12 relative to the vehicle tracking apparatus 10. It is to be appreciated that whilst the method 60 is discussed in context of the provision of the position of IR emitters or reflectors 30A, 30B, 30C, 30D, 30E, in some embodiments, information regarding a ground space envelope 36 is additionally provided in accordance with embodiments discussed above. In such embodiments, when an association is performed at Step 68, a calculation of a ground space envelope 36 of the vehicle 12 is additionally performed using the provided ground space envelope 36 information in accordance with above embodiments and this information is used to perform the association (i.e. a vehicle 12 may be configured to provide an initial position of its ground space envelope 36, and the vehicle tracking apparatus 10 is configured to compare this information with the calculated ground space envelope). This information may then also be stored at Step 70.

It is to be appreciated that the vehicle tracking apparatus 10 may receive multiple sets of unique identification data and initial position data simultaneously. In such cases, the method 60 is configured to repeat itself for each set of unique identification data and initial position data simultaneously and concurrently. Alternatively, the method 60 may be configured to operate simultaneously for each set of unique identification data and initial position data.

Figure 5B:
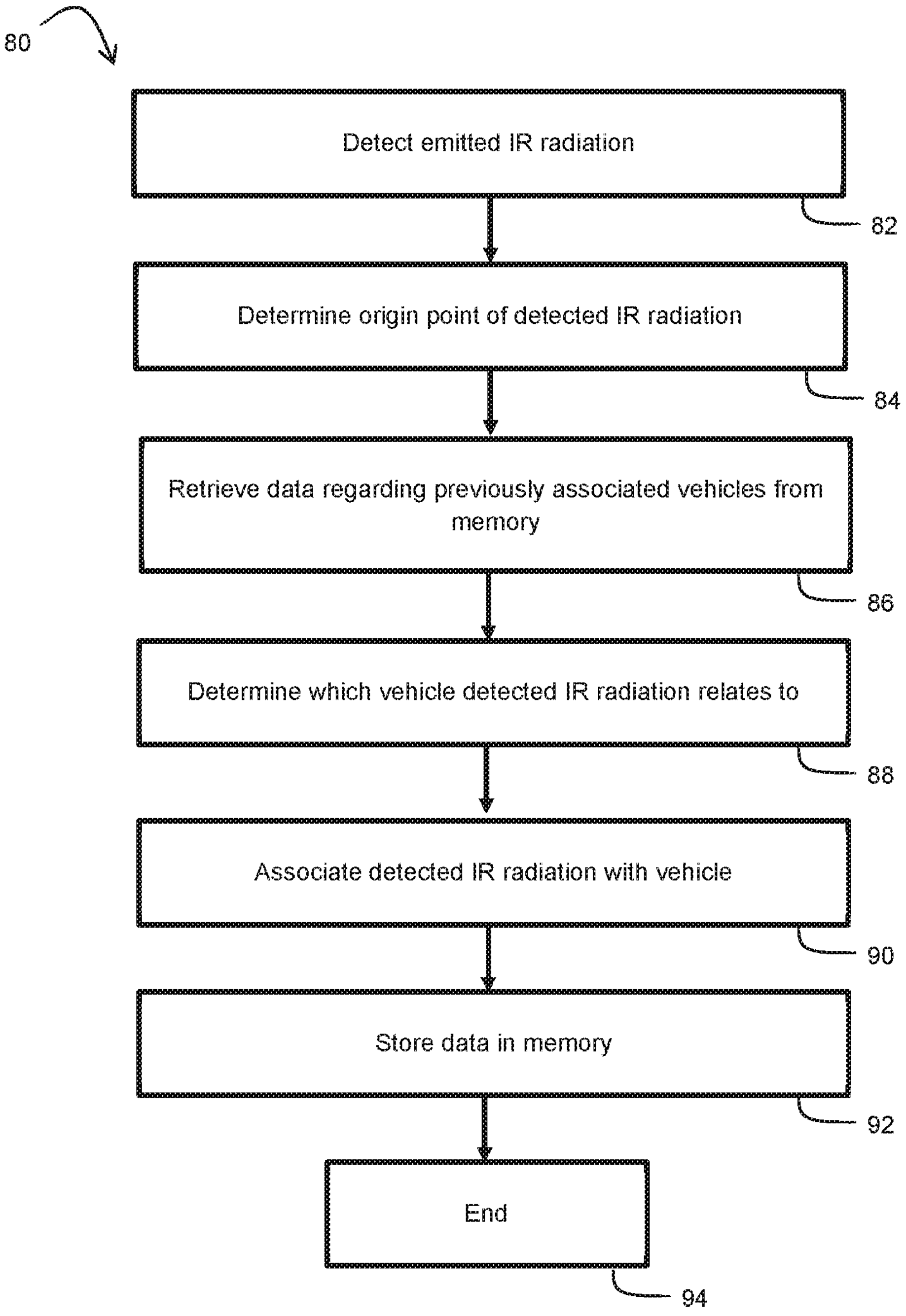
FIG. 5B is a flow diagram illustrating a further method of operation of the vehicle tracking apparatus of FIG. 1.

Referring to FIG. 5B, there is shown a further method of operation 80 of the vehicle tracking apparatus 10 described in embodiments above. In particular, FIG. 5B describes the method 80 by which the vehicle tracking apparatus 10 associates IR emissions with a vehicle 12 which has previously been detected and associated with IR emissions.

The method 80 begins by detecting, at Step 82, IR radiation either being emitted from or reflected by the IR emitters or reflectors 30A, 30B, 30C, 30D, 30E of the one or more vehicles 12 to be tracked in accordance with embodiments described above. Following this, the method 60 continues by determining, at Step 84, the origin point of the detected IR radiation. This may be achieved in accordance with embodiments described above and may be performed by the processor 46. This step enables a position to be associated with the received IR radiation.

Once the origin point of the IR emissions has been determined, the method 80 continues by retrieving, at Step 84, the positions of previously identified vehicles from the memory 48 of the vehicle tracking apparatus 10. This may comprise retrieving all previously stored data. Alternatively, the processor 46 may be configured to only retrieve a subset of this data. This may comprise only retrieving the most recent position stored for each vehicle 12. This may also comprise retrieving filtered information, where the filter may specify only retrieving information relating to vehicles whose position is within a predetermined distance of the origin point of the IR emissions.

Once the positions have been retrieved, the method 80 continues by determining, at Step 86, which of the vehicles 12, whose information has previously been stored, the IR emissions relate to. This may be achieved by determining whether any of the retrieved position data lies sufficiently close to the origin of the IR emissions in accordance with embodiments described above. When this is complete, the method 80 continues by associating, at Step 88, the position of origin of the IR emissions with the vehicle identified in Step 86. This association may comprise updating the identified vehicle's 12 current position as being the position of origin of the IR emissions. The method 80 continues by storing, at Step 90, the current position in the memory 48 in the memory record of the identified vehicle 12, in accordance with embodiments described above. As noted, this storing may additionally comprise storing a timestamp at which the IR emissions were received. The method then proceeds to end at Step 92.

As discussed with reference to FIG. 5A, in embodiments where ground space envelope 36 information has previously been provided and stored in the memory 48, where information is retrieved at Step 86, this may also comprise retrieving the ground space envelope 46 information. This may then be utilised to calculate kinematic data regarding the ground space envelope 36 as discussed previously to determine which vehicle 12 the detected IR information relates to (i.e. a previously calculated position of the ground space envelope 36 of a vehicle 12 may be compared to a, currently calculated ground space envelope 36 to determine the vehicle 12 that the detected IR information relates to). Again, this new kinematic information may then be stored in memory 48 at Step 92.

Figure 5C:
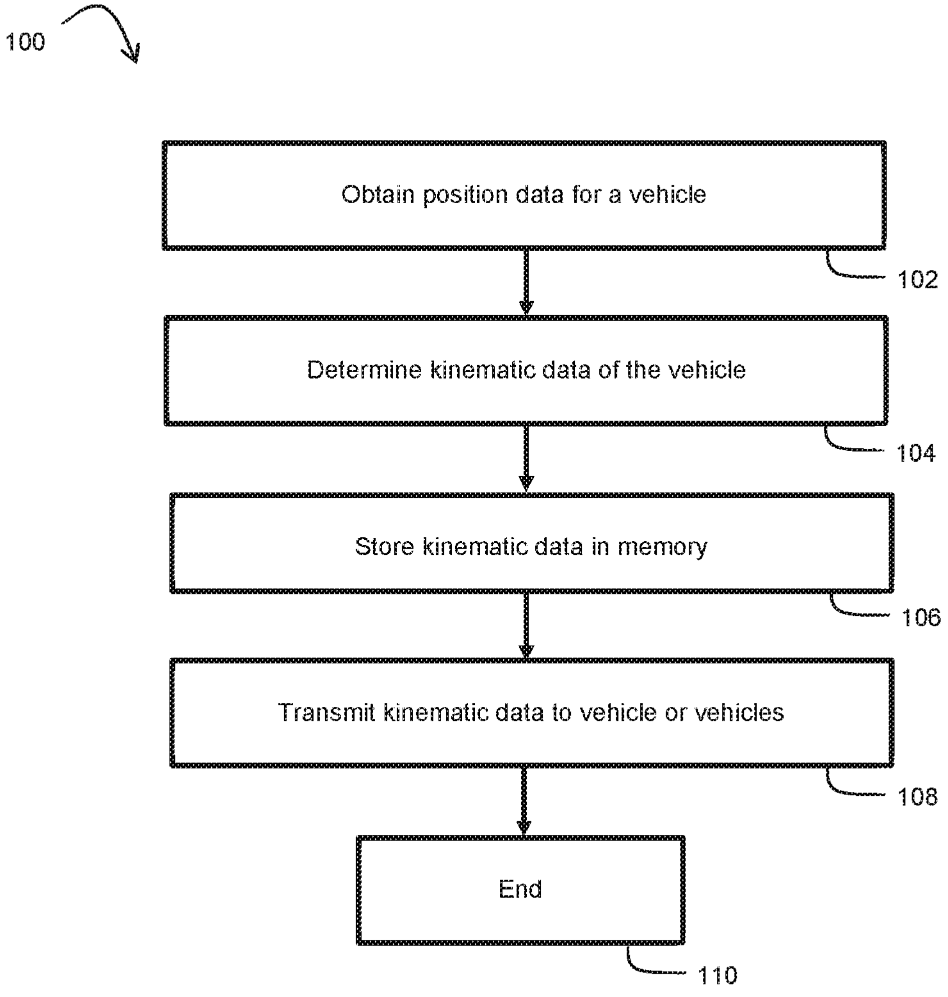
FIG. 5C is a flow diagram illustrating a yet further method of operation of the vehicle tracking apparatus of FIG. 1.

Turning now to FIG. 5C, there is shown a method of operation 100 of the vehicle tracking apparatus 10 described in embodiments above. In particular, FIG. 5C describes the method 100 by which the vehicle tracking apparatus 10 determines and transmits kinematic data for one or more vehicles 12 in the field of view of the vehicle tracking apparatus 10.

The method of operation 100 begins by obtaining, at Step 102, position data for a particular vehicle 12 in the field of view of the vehicle tracking apparatus 10. This may comprise receiving IR emissions, determining their origin position and associating this with a particular vehicle in accordance with the methods 60, 80 of FIGS. 5A and 5B above. This may also comprise retrieving position data from the memory 48 for a particular vehicle.

Following this, the processor 46 then uses the obtained position information to determine, at Step 104, kinematic data of the vehicle 12. In some cases, this simply comprises determining a position of the vehicle 12 in one or two dimensions, in which case the obtaining and determining steps are the same. In other embodiments, the kinematic data comprises calculating quantities such as velocity and acceleration in one or two dimensions, which requires a plurality of positions to be obtained, in conjunction with the time at which that position was determined. In such embodiments, the processor will typically obtain a plurality of positions and associated timestamps from the memory 48. The retrieval of positions from the memory 48 may be combined with IR emission origin data, which has not yet been stored in the memory 48. The calculation of velocities and accelerations using position and temporal data is well known and will not be described further here.

Once the required kinematic data has been determined, the determined data is stored, at Step 106, in the memory 48 of the vehicle tracking apparatus 10. Following this storage, the method 100 continues by transmitting, at Step 108, the determined kinematic data to one or more of the vehicles 12 in accordance with embodiments described above. This may comprise transmitting the data only to the vehicle to which it relates. This may also comprise transmitting the data to a plurality of the vehicles 12 in the field of view of the vehicle tracking apparatus 10. In certain embodiments the method may further comprise transmitting, at Step 108, the kinematic data to the TMS. It is to be appreciated that the method of data transmission to a TMS may be the same as that for transmission to the vehicles 12. Alternatively, the method of data transmission may comprise utilising additional system infrastructure and methods. Such alternatives are described in greater detail with reference to FIG. 10 below. The method of operation 100 then proceeds to end at Step 110.

In embodiments in which the processor is additionally configured to generate a control or warning signal to be transmitted to one or more vehicles 12, the method 100 comprises an additional step between Steps 106 and 108 in which the control or warning signal is calculated and determined in accordance with embodiments described above. This control or warning signal is then additionally transmitted with the kinematic data at Step 108 or may be transmitted instead of the kinematic data.

In embodiments where ground space envelope 36 information is provided, the calculation of kinematic data of the vehicle 12 at Step 104 may comprise determining kinematic data in relation to the ground space envelope 36 of the vehicle 12 in accordance with embodiments described above. This data relating to the ground space envelope 36 may then be stored, at Step 106, and transmitted, at Step 108.

Figure 6:
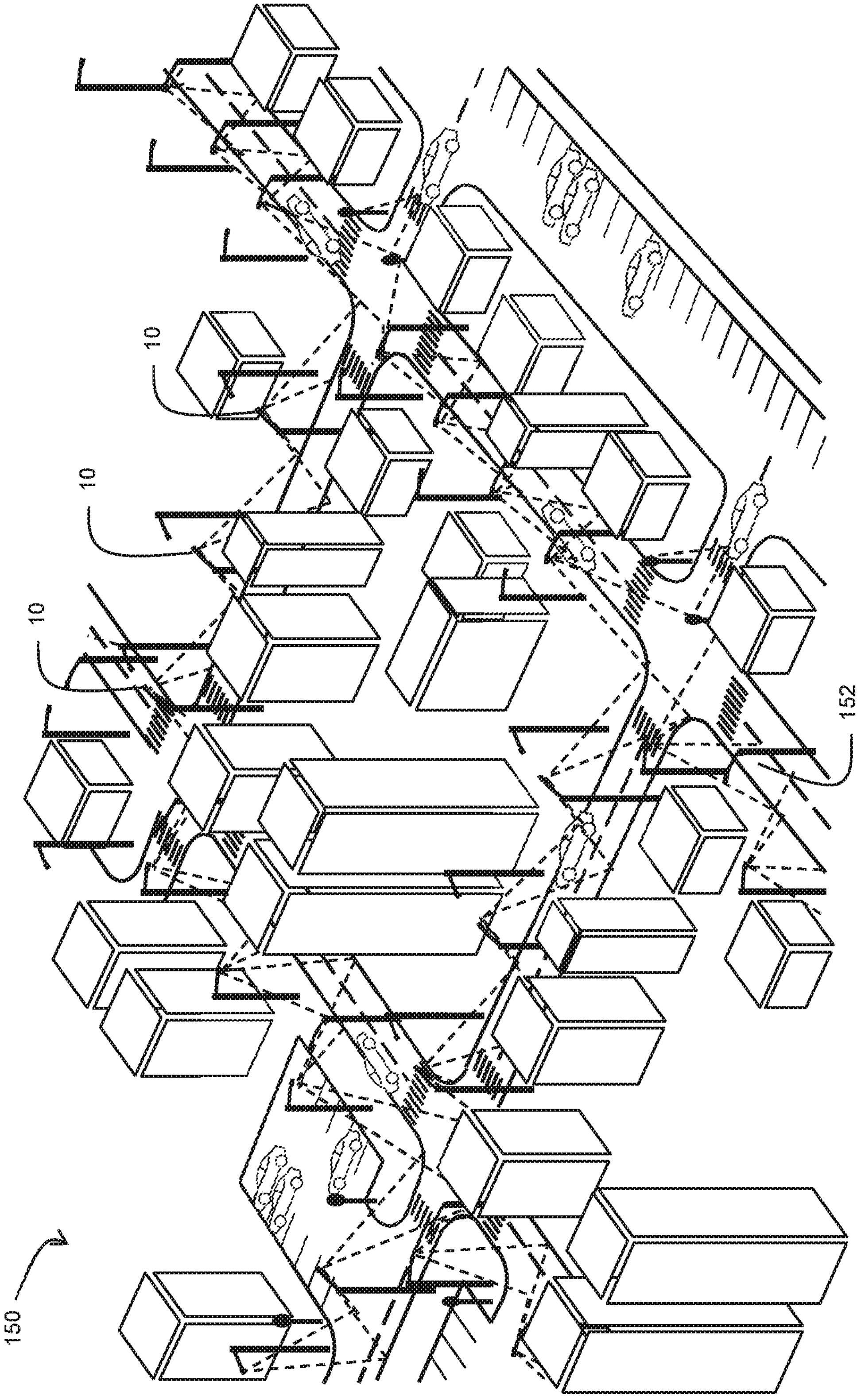
FIG. 6 is an isometric view of a vehicle tracking system comprising a plurality of the vehicle tracking apparatuses of FIG. 1 in a use scenario.

Referring now to FIG. 6, there is shown is an isometric view of a vehicle tracking system 150 comprising a plurality of the vehicle tracking apparatuses 10 of embodiments described above for detecting one or more ground-based vehicles 12 and determining various kinematic data in respect of the detected vehicles 12. For the purposes of clarity, not all of the vehicle tracking apparatuses 10 have been labelled in the figure. More specifically, the vehicle tracking system 150 shown comprises a plurality of vehicle tracking apparatuses 10 installed in an urban environment and is configured to determine various kinematic data in respect of the detected vehicles 12 over an area which is greater than the field of view (or 'cell' 152) of any one of the individual vehicle tracking apparatuses 10. In this manner, the vehicle tracking system 150 enables tracking of one or more vehicles 12 over a large area. It is to be appreciated that whilst the vehicle tracking system 150 is shown installed in an urban environment in which a plurality of obstacles may obstruct the field of view of a vehicle tracking apparatus 10 (e.g. buildings, road infrastructure), the vehicle tracking system 150 may equally be employed to track vehicles 12 over a large area where such obstructions are not present, such as on an extended length of road, for example a highway or motorway, or on an extended length of rail track. The vehicle tracking apparatuses 10 of the vehicle tracking system 150 may again be affixed to existing infrastructure, such as lampposts, traffic lights, gantries and buildings.

The vehicle tracking system 150 shown comprises a plurality of vehicle tracking apparatuses 10 as described in embodiments above, each in its own cell 152. The plurality of cells 152 make up a network, which covers an area monitored by the vehicle tracking system 150. Each of the vehicle tracking apparatuses 10 may comprise any of the elements above in order to achieve the desired functionality associated with those features. In particular, each apparatus 10 may comprise features which allow for unique identification data for each vehicle 12 to be received, IR emissions to be detected, and various kinematic data to be calculated and transmitted to one or more vehicles 12. It is to be appreciated that each vehicle tracking apparatus 10 in the vehicle tracking system 150 may be provided with features from different embodiments to achieve different functionalities in each cell i.e. each vehicle tracking apparatus 10 in the system 150 need not be provided with the same features. For example, one apparatus 10 in the system 150 may be configured to monitor an entry point into the system 150 and be configured to receive information from a vehicle 12 or to be provided with preconfigured position information in accordance with embodiments described above. Other apparatuses 10 in the system 150 may not need such functionality since they do not monitor this entry position.

In the vehicle tracking system 150 of FIG. 6, each vehicle tracking apparatus 10 may additionally be configured to transmit the calculated kinematic data to one or more of the other vehicle tracking apparatuses 10 in the vehicle tracking system 150. This may be achieved through suitable configuration of the receiver 40, processor 46 and transmitter 50 of each of the vehicle tracking apparatuses since the range of transmission is similar to that between a tracking apparatus and vehicles 12 within its field of view. Alternatively, other communication mechanisms may be involved, for example there may be wired connections between the vehicle tracking apparatuses 10. Furthermore, each vehicle tracking apparatus 10 may similarly be configured to transmit unique identification data of a vehicle 12 to one or more of the other vehicle tracking apparatuses 10 in the vehicle tracking system 150 in conjunction with the calculated kinematic data. In this way, when a vehicle 12 passes through and out of the field of view of a particular vehicle tracking apparatus 10, the various data may be passed (or may already have been passed) to another vehicle tracking apparatus 10 whose cell 152 the vehicle 12 is now passing into. This data may be used analogously to the data originally transmitted to the vehicle tracking apparatus 10 by the vehicle 12 to associate a received IR emission with a vehicle 12, which is entering the first cell of the vehicle tracking system 150. Where kinematic data is transmitted, any positional data may also be provided with respect to the vehicle tracking apparatus 10 which calculated it. Alternatively, when the positional data is transmitted, it may first be processed such that the position of the vehicle 12 is given with respect to the vehicle tracking apparatus 10 it is being sent to rather than the apparatus 10 it is being sent from. Alternatively, the vehicle tracking apparatus 10, which receives the positional data, may be configured to convert this data itself. Alternatively, an absolute position of the one or more vehicles 12 may be transmitted (for example, longitude and latitude coordinates).

In the vehicle tracking system 150 of FIG. 6, each vehicle tracking apparatus 10 may additionally be configured to transmit the calculated kinematic data to one or more of the other vehicle tracking apparatuses 10 in the vehicle tracking system 150. This may be achieved through suitable configuration of the receiver 40, processor 46 and transmitter 50 of each of the vehicle tracking apparatuses. Furthermore, each vehicle tracking apparatus 10 may similarly be configured to transmit unique identification data of a vehicle 12 to one or more of the other vehicle tracking apparatuses 10 in the vehicle tracking system 150 in conjunction with the calculated kinematic data. In this way, when a vehicle 12 passes through and out of the field of view of a particular vehicle tracking apparatus 10, the various data may be passed to another vehicle tracking apparatus 10 whose cell 152 the vehicle 12 is now passing into. This data may be used analogously to the data originally transmitted to the vehicle tracking apparatus 10 by the vehicle 12 to associate a received IR emission with a vehicle 12, which is entering the first cell of the vehicle tracking system 150. Where kinematic data is transmitted, any positional data may also be provided with respect to the vehicle tracking apparatus 10 which calculated it. Alternatively, when the positional data is transmitted, it may first be processed such that the position of the vehicle 12 is given with respect to the vehicle tracking apparatus 10 it is being sent to rather than the apparatus 10 it is being sent from. Alternatively, the vehicle tracking apparatus 10, which receives the positional data, may be configured to convert this data itself. Alternatively, an absolute position of the one or more vehicles 12 may be transmitted (for example, longitude and latitude coordinates).

In embodiments in which each vehicle tracking apparatus 10 is configured to transmit unique identification data and calculated kinematic data to other vehicle tracking apparatuses 10, it is not necessary for each vehicle tracking apparatus to receive unique identification data or any other data from the vehicle itself. In such embodiments, the system 150 is configured to initially receive unique identification data and initial position data from a vehicle 12 at designated vehicle tracking apparatus 10, in accordance with embodiments described above. This vehicle tracking apparatus 10 is configured to monitor a designated "entry point" (or entry cell) where the vehicles are configured to enter the area being monitored by the vehicle tracking system 150. Alternatively, such a vehicle tracking apparatus 10 may be configured to monitor a preconfigured known position as described in embodiments above. As such initial position information and/or unique identification information may not need to be provided by the vehicle. Following this, the relevant information is then transmitted to the other vehicle tracking apparatuses 10 by the vehicle tracking apparatus which has received the data from the vehicle. In such embodiments, any vehicle tracking apparatus 10, which is not monitoring an entry cell is configured not to receive this information from the one or more vehicles 12, and instead only receive transmissions from other vehicle tracking apparatuses 10.

In further embodiments, the cell 152 being monitored by each of the vehicle tracking apparatuses 10 is configured to overlap with other cells, such that there are points at which the one or more vehicles 12 being tracked is in the field of view of a plurality of the vehicle tracking apparatuses 10. In such embodiments, each of the relevant vehicles tracking apparatuses 10 is each configured to calculate kinematic data for the one or more vehicles. In some embodiments, the calculated kinematic data for each vehicle, is transmitted to each of the other vehicle tracking apparatuses 10 that the one or more vehicles 10 are in the cell of, and the data is compared. The processor of each vehicle tracking apparatus is then configured to compare the data and use a voting algorithm to determine whether the data is in agreement, and where it is not, to veto the data which is not in agreement such that it is not transmitted to the vehicle 12 (or other transmission destination). This allows checking of data consistency or continuity between each vehicle tracking apparatus 10 and its first, second and possibly third overlapping tracking devices and in the latter 2 cases enables a failed tracking apparatus 10 to be detected and voted out. This creates a 'triplex' or 'quadruplex' redundant architecture capable of achieving the required safety integrity for information provided to vehicles of better than $1\times10^{-8}$ failures per vehicle mile whilst allowing tracking apparatus failures to be tolerated and hence repaired to achieve high information availability. In addition, status information from diagnostic or prognostic equipment on each vehicle 12 can be communicated back to the vehicle tracking apparatus 10 enabling neighbouring vehicles 10 or any involved traffic management system to be alerted to any failures or predicted failures, particularly failed IR emitters, further improving overall system integrity.

In further embodiments, the voting algorithm may be employed in an alternate manner in which data consistency or continuity is determined between a plurality of tracking apparatuses 10 where cells abut, or nearly abut but do not overlap. In such embodiments, a comparison between the measured positions of one or more vehicles 10 by a plurality of vehicle tracking apparatuses 10 is performed by the voting algorithm. Through this comparison, the voting algorithm is able to detect to a very high integrity level consistent with that of the previous paragraph where an inconsistent position is produced by one of the vehicle tracking apparatuses 10. By way of illustrative example, the voting algorithm employed by a group of four adjacent vehicle tracking apparatuses 10 may determine by a rolling pairwise comparison communicated to the fourth tracking device which one of the tracking apparatuses 10 is inconsistent with the other three. In such an example, the voting system may flag the errant apparatus 10 as being faulty and ignore, override, replace with an interpolation or otherwise deal with any measurements it makes until the faulty equipment is repaired. The voting algorithm may additionally be configured to await a plurality of erroneous measurements being determined before an apparatus is highlighted as being faulty. Whilst this example mentions the use of four vehicle tracking apparatuses 10, it is to be appreciated that a voting algorithm may be employed by any plurality of vehicle tracking apparatuses 10, such as a triplex or quadruplex or higher orders of apparatuses 10. In some embodiments, the vehicle tracking apparatuses 10 that employ the voting algorithm are 'rolling' along a system of vehicle tracking apparatuses (i.e. where the voting algorithm is between four apparatuses 10, apparatus numbers 1 to 4 will vote between themselves, then numbers 2 to 5, 3 to 6 etc). As a variant on this architecture, the vehicle tracking apparatuses 10 can be arranged in groups of 3 or 4 or more with fixed voting algorithms between the 3 or 4 or more and track consistency checking both within and at the handovers between the groups of 3 or 4. In some embodiments, there may be cells abutting or nearly abutting in some parts of the network and cells overlapping in other parts, perhaps where the traffic safety risk is higher. Such embodiments with said abutments and overlaps can enable fewer vehicle tracking apparatuses 10 to be used over an extended area whilst still enabling a plurality of vehicle tracking apparatuses 10 to monitor a common area.

Figure 7:
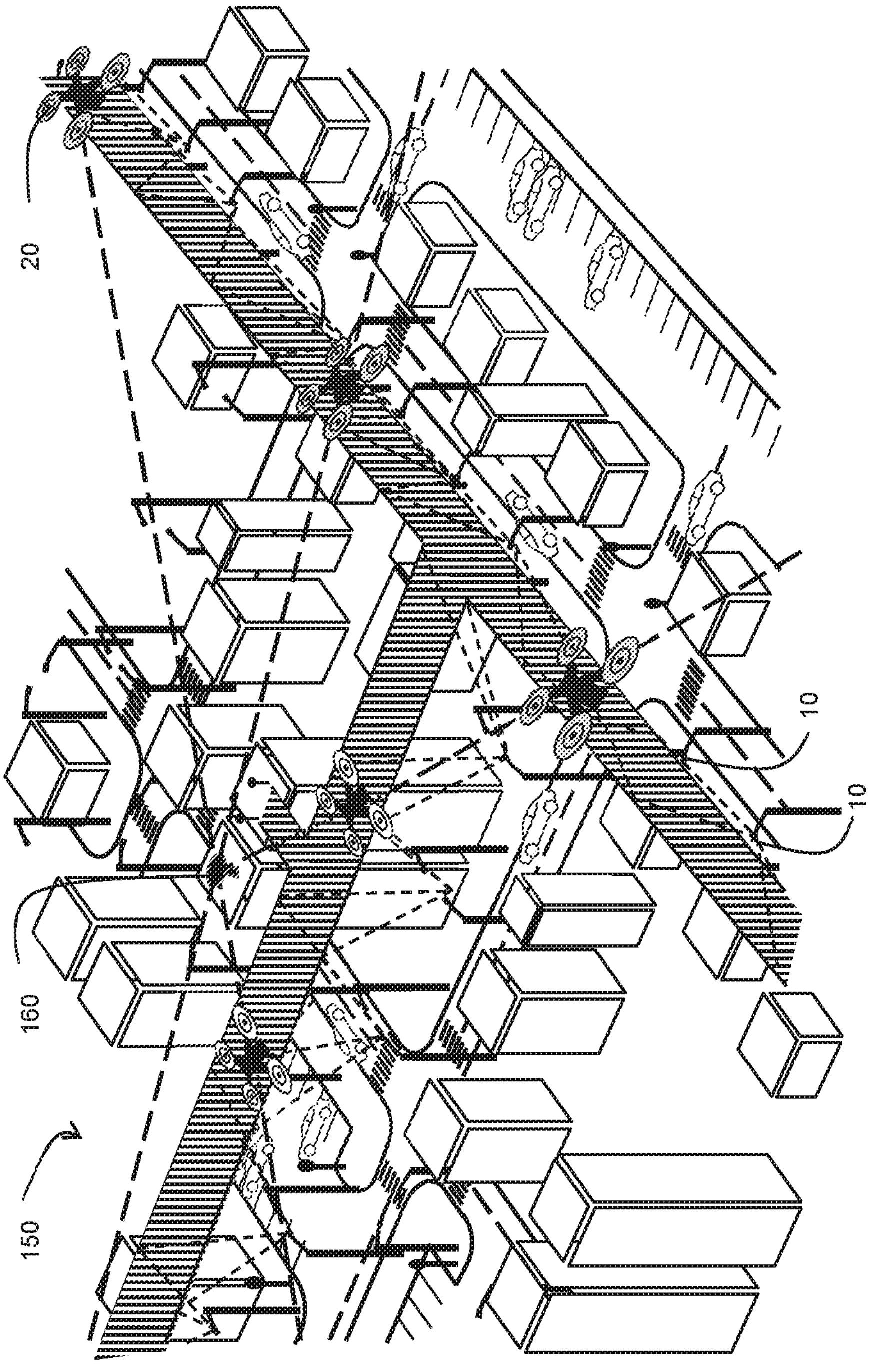
FIG. 7 is an isometric view of the vehicle tracking system of FIG. 6 in an alternate use scenario.

The embodiment of the vehicle tracking system 150 of FIG. 6 shows an implementation in which the vehicle tracking system 150 is configured to detect and determine kinematic data of ground-based vehicles. However, the vehicle tracking system 150 may equally be configured to monitor airborne vehicles 20. An example of such a configuration is shown in FIG. 7, where the system is again arranged in an urban environment. Again, for the purposes of clarity, not all vehicle tracking apparatuses 10 and airborne vehicles 20 have been labelled. It is to be appreciated that in this configuration, the same features and functionalities of the vehicle tracking system 150 are included, except that the vehicle tracking system 150 is configured to monitor for IR emissions or reflections being received from above the system 150 rather than below. Each vehicle tracking apparatus 10 of the vehicle tracking system 150 has a field of view in this configuration, or alternatively "sky cells." In the present embodiments the tracking systems for airborne cells must be orientated off vertical, towards north (south in southern hemisphere), to avoid solar glare. Abutting sky cells that form a 'lane in the sky' must be at a safe separation from lanes in the contraflow direction.

Figure 8A:
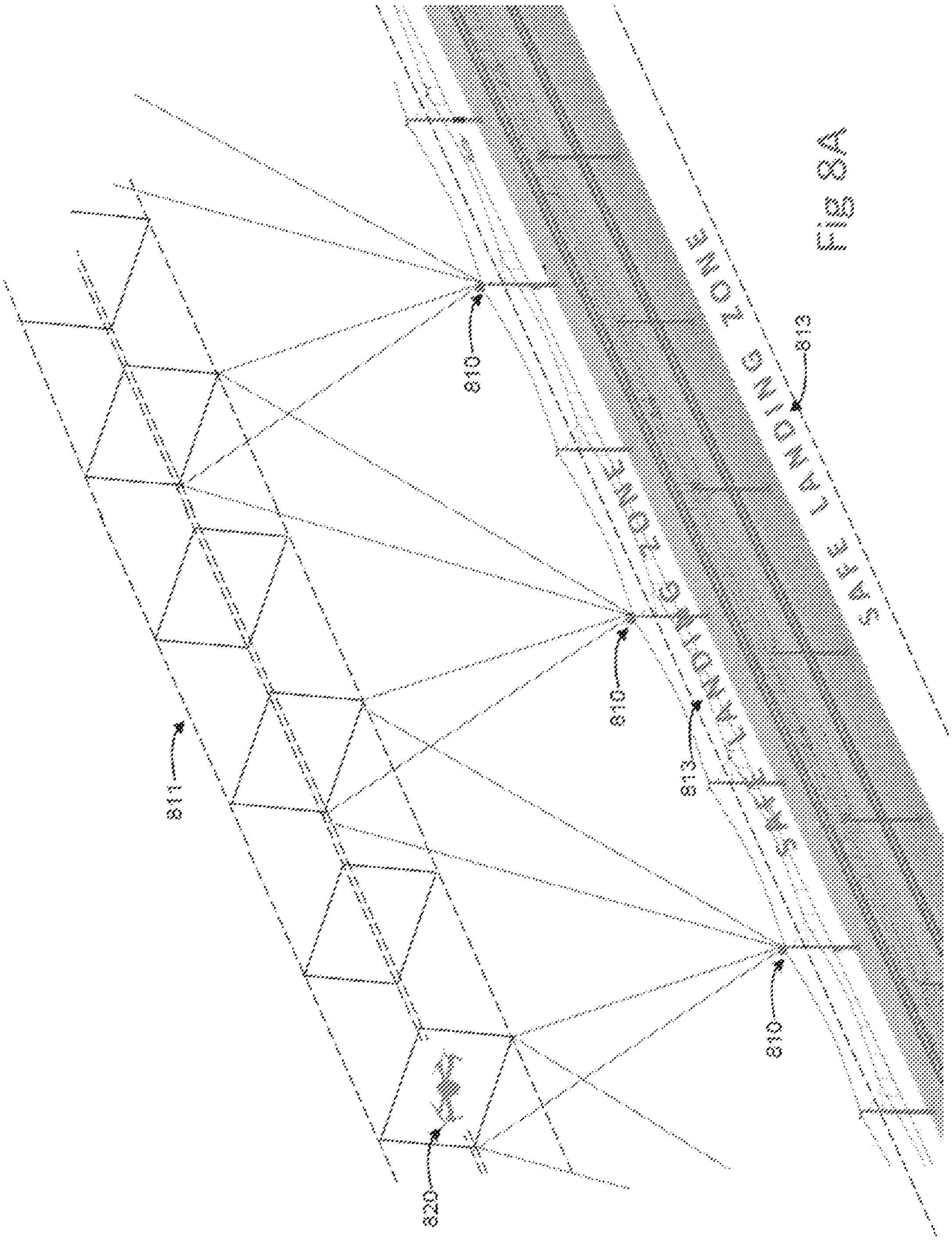
FIGS. 8A and 8B are isometric views of the vehicle tracking system of FIG. 6 in a further alternate use scenario.
Figure 8B:
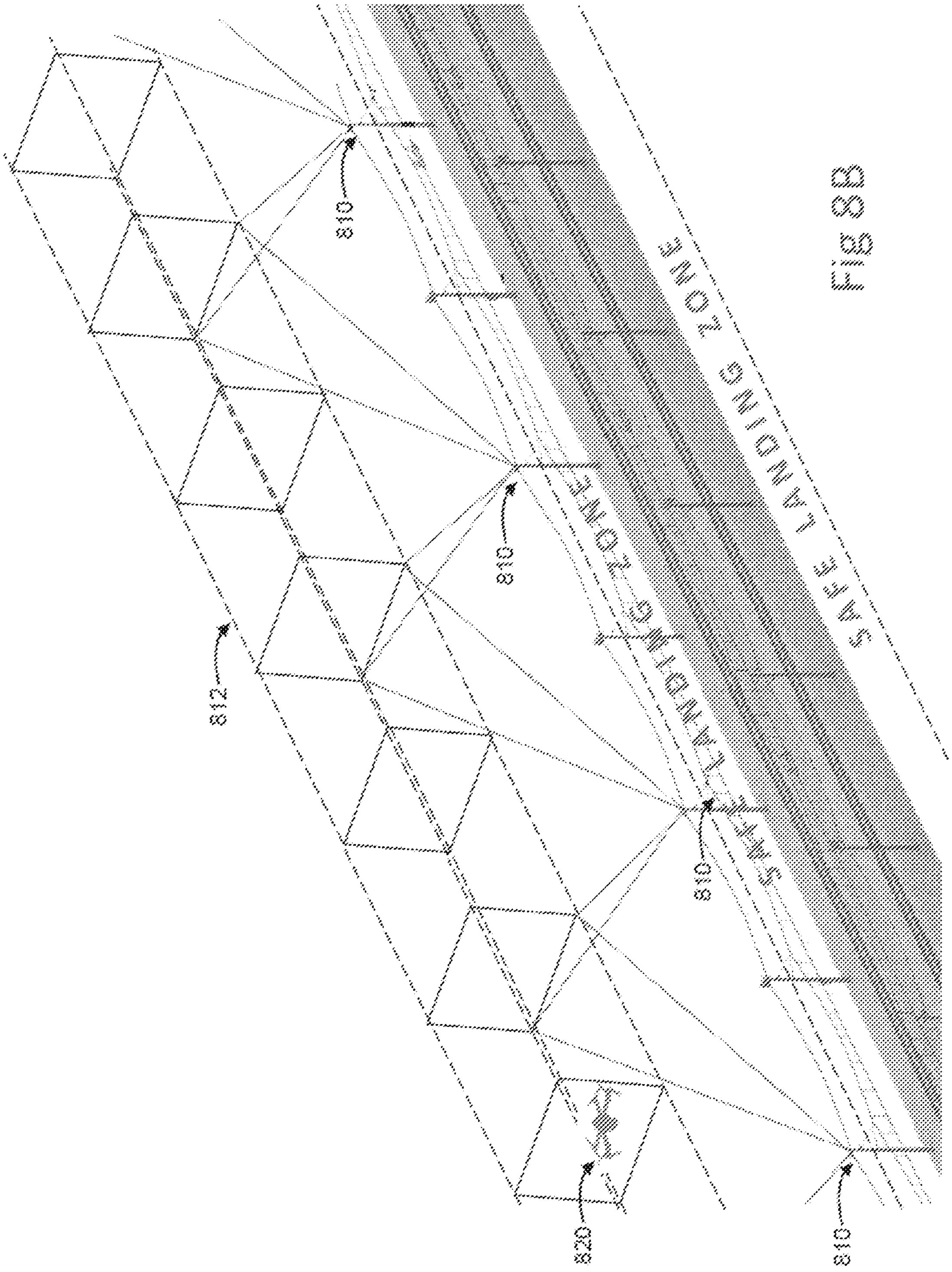

A further example of how upwards facing vehicle tracking systems 810 may be configured to create air corridors for vehicles such as delivery/collection drones is shown in FIGS. 8A and 8B. In this configuration the vehicle tracking apparatuses have a narrower field of view and can be arranged to create air corridors at higher altitudes above, for example here, an electrified rail track. This also allows for more than one air corridor to be created at differing altitudes by linking alternate or multiply alternate vehicle tracking apparatuses together. In FIG. 8A even-numbered tracking apparatuses create a corridor 811 at, say, 300 ft altitude and odd-numbered tracking apparatuses create a corridor 812 at, say, 150 ft, the fields of view of the IR sensors on the rail gantries being configured to create abutting or slightly overlapping cells in the sky at those altitudes. Thus, two different air corridors are created by using alternate vehicle tracking apparatuses 810 of the system. Each vehicle tracking apparatus may also include an upwards facing IR emitter, a number of which will be visible to an IR sensor appropriately mounted on the air vehicle 820. This will provide yet another means for the air vehicle to monitor and control its own altitude by straightforward triangulation as the IR emitters will be regularly spaced. The IR emitters can also be used to create 'runway lights' for a 'landing strip' to the side of the railway which will be visible to the IR sensor on the air vehicle. This may be useful for normal operations but would be particularly useful in creating a safe landing zone 813 for air vehicles that have for example developed a fault or be low on fuel. In this way, the infrastructure system created by the present embodiment will enable safe, regulated flight of autonomous air vehicles.

It is also to be appreciated that whilst the two ground-based and airborne monitoring configurations are shown as separate embodiments, the two embodiments may be combined in a third embodiment in which monitoring of airborne and ground-based vehicles is achieved simultaneously. This is achieved in accordance with appropriate configurations of the described embodiments of the vehicle tracking apparatus 10 above. In addition, the vehicle tracking system 150 may be configured at certain points, to only detect and calculate kinematic data for either ground-based or airborne vehicles. By way of example, this may be achieved by providing upward facing or downward facing IR sensors 44 in a vehicle tracking apparatus 10 in dependence upon whether airborne or ground-based vehicles are to be detected in the field of view of a particular vehicle tracking apparatus 10. In this manner, redundant components may be removed where a particular type of monitoring is not required in a particular area. FIG. 7 also shows a horizontal, 360° laser beacon 160 giving a horizontal, wide-area reference signal that airborne vehicles can use to maintain precise altitude.

Figure 9:
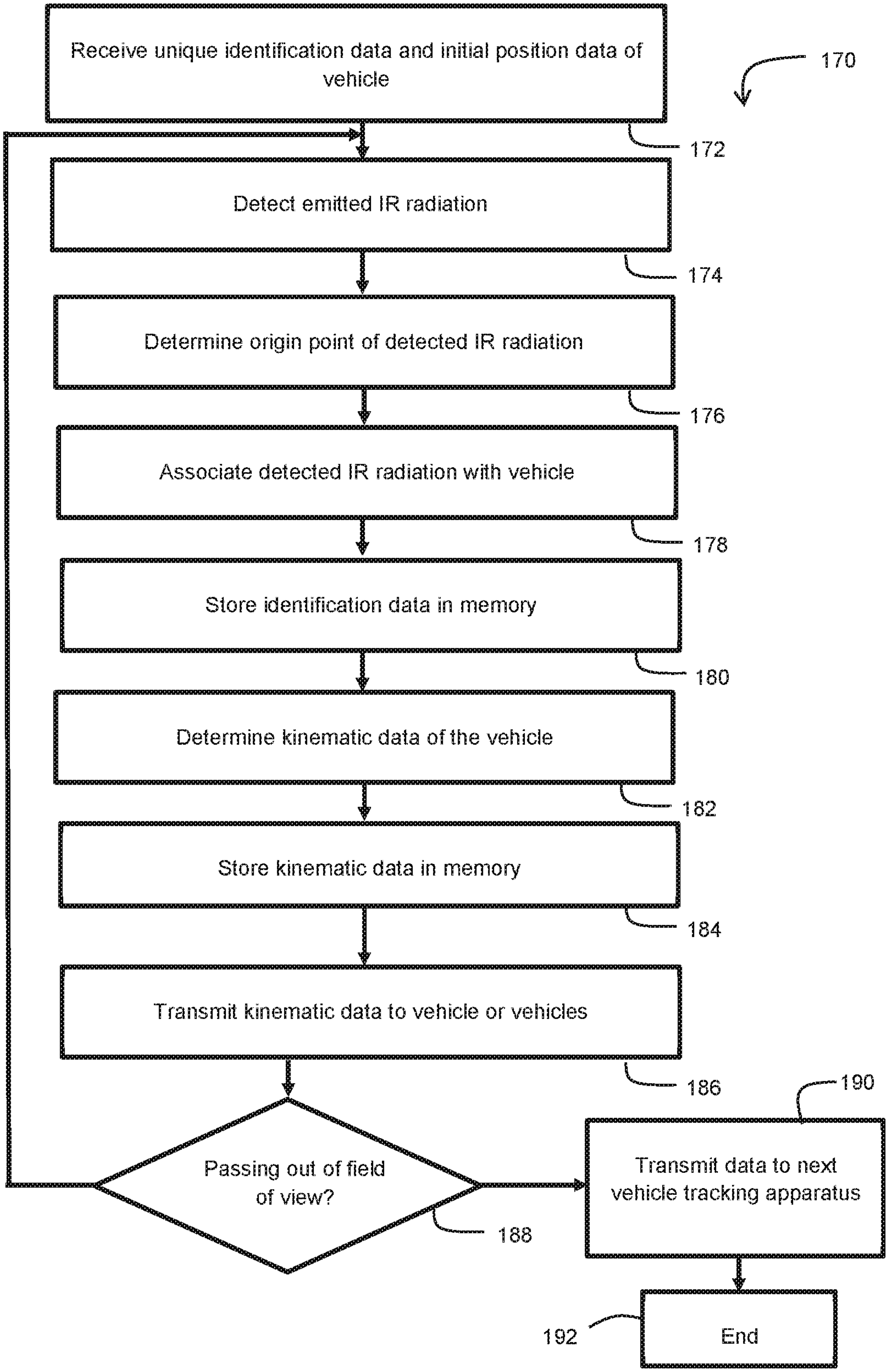
FIG. 9 is a flow diagram illustrating a method of operation of the vehicle tracking system of FIG. 6.

Referring to FIG. 9, there is shown a method of operation 170 of the vehicle tracking system 150 described above. In particular, the method 170 relates to how a vehicle tracking apparatus 10 of the vehicle tracking system 150 in one cell 152 receives information from another vehicle tracking apparatus 10 in another typically adjacent cell 152 and uses this to determine kinematic data for a vehicle 12 entering its field of view. It is to be appreciated that initial acquisition of data and determination of kinematic data by a first vehicle tracking apparatus 10, at a cell where the vehicle enters the network of cells, may be achieved using relevant steps of the method 60 of FIG. 5A, and the present method 170 relates to the procedure followed by a vehicle tracking apparatus 10 subsequent to the first vehicle tracking apparatus 10.

The method 170 begins by receiving, at Step 172 identification data, kinematic data (position, velocity, acceleration, deceleration, orientation or other useful kinematic data) and vehicle geometry data transmitted from its upstream neighbour about each vehicle that is about to enter its field of view. This occurs analogously to Step 62 of FIG. 5A where information is received from the vehicle 12 in so much as the relevant data is received from its upstream neighbouring vehicle tracking apparatus 10 via the receiver 40. In this case, the initial position data of the vehicle 12 which is transmitted may comprise a position calculated by the upstream neighbouring vehicle tracking apparatus 10

The method 170 continues by detecting, at Step 174, IR radiation either being emitted from or reflected by the IR emitters or reflectors 30A, 30B, 30C, 30D, 30E of the one or more vehicles 12 to be tracked in accordance with embodiments described above. The IR radiation is detected by the one or more IR sensors 44. It is to be appreciated that whilst Steps 172 and 174 are shown sequentially, the two transmissions may equally be received in the opposite order, or simultaneously.

Following this, the method 170 continues by determining, at Step 176, the origin point of the detected IR radiation. This is achieved in accordance with embodiments described above and is performed by the processor 46. This step enables a position to be associated with the received IR radiation. Following this determination, the vehicle tracking apparatus 10 then proceeds to associate, at Step 178, the received IR emissions with the received unique identification data of one or more vehicles 12. This is achieved by comparing the determined position of the IR emissions with the received position data of the vehicle 12, in accordance with embodiments described above. In some embodiments, multiple sets of IR emissions with different origin positions are received simultaneously. In these embodiments, the method 60 comprises comparing the received position of the vehicle 12 with each of the sets of IR emissions until a suitable emission is found that the vehicle 12 can be associated with. Once the vehicle 12 has been associated with an IR emission, the method 170 continues by storing, at Step 180, the unique identification data of the vehicle 12 and the initial position of the vehicle 12 in the memory 48, in accordance with embodiments described above.

It is to be appreciated that the vehicle tracking apparatus 10 may receive multiple sets of unique identification data and initial position data simultaneously. In such cases, the method 170 is configured to repeat itself for each set of unique identification data and initial position data simultaneously concurrently. Alternatively, the method 170 is configured to operate simultaneously for each set of unique identification data and received position data simultaneously.

The method of operation 170 continues by using the obtained information to determine, at Step 182, kinematic data of the vehicle 12. In some cases, this simply comprises determining a position of the vehicle 12 in one or two dimensions, in which case the obtaining and determining steps are the same. In other embodiments, the step of determining kinematic data comprises calculating quantities such as velocity and acceleration in one or two dimensions, which requires a plurality of positions to be obtained, in conjunction with the time at which that position was determined. In such embodiments, the processor typically obtains a plurality of positions and associated timestamps from the memory 48. The retrieval of positions from the memory 48 may be combined with IR emission origin data, which has not yet been stored in the memory 48. The calculation of velocities and accelerations using position and temporal data is well known and will not be described further here.

Once the required kinematic data has been determined, the determined data is stored, at Step 184 in the memory 48 of the vehicle tracking apparatus 10. Following this storage, the method 100 continues by transmitting, at Step 186, the determined kinematic data to one or more of the vehicles 12 in accordance with embodiments described above. This may comprise transmitting the data only to the vehicle to which it relates. This may also comprise transmitting the data to a plurality of the vehicles 12 within the field of view of the vehicle tracking apparatus 10 or beyond the field of view but within the communication range between vehicle tracking apparatuses. In embodiments in which the kinematic data is to be transmitted to a TMS, Step 186 also comprises transmitting the kinematic data to the TMS.

Following this, the method 170 continues by determining, at Step 188, whether the vehicle 12 whose kinematic data has been determined is about to pass out of the field of view of the present vehicle tracking apparatus 10. This determination may comprise comparing a determined position of the vehicle 12 to a known end position of the field of view of the vehicle tracking apparatus 10. Where the vehicle 12 is within a predetermined range of this end position, it may be determined that the vehicle is passing out of the field of view of the vehicle tracking apparatus 10. Where it is determined that it is not, the method 180 returns to Step 174 and detects new IR emissions to be associated with the vehicle 12. Where it is determined that the vehicle 12 is passing out of the field of view of the tracking apparatus 10, the method 170 proceeds to transmit, at Step 190, transmits the identification data and kinematic data about the vehicle 12 that is about to leave its field of view to its downstream neighbouring IR tracking sensor. The method then proceeds to end at Step 192.

In embodiments where it is intended to provide one or more vehicles 12 within the field of view of the vehicle tracking apparatus 10 or beyond the field of view but within the communication range between vehicle tracking apparatuses with kinematic data regarding a plurality of vehicles 12 in the field of view of the vehicle tracking apparatus 10, it is to be appreciated that the method 170 of FIG. 9 may be modified in order to achieve this. Such modification may comprise, at Step 182, the processor 46 being configured to determine kinematic data for a plurality of vehicles 12 in its field of view simultaneously. This may comprise retrieving from the memory 48 data relating to all the vehicles in the field of view of the vehicle tracking apparatus 10 as determined in accordance with embodiments described above. The relevant kinematic data may then be calculated for each of these vehicles 12 and subsequently stored in accordance with Step 184. Then, at Step 186, the kinematic data for all the vehicles 12 in the field of view may be transmitted to the one or more vehicles 12. It is also to be appreciated that only a subset of the calculated kinematic data may be transmitted to each vehicle 12. This subset may be determined on the basis of the vehicles which are in the vicinity of the vehicle 12 to which the data is to be transmitted. For example, if there are 10 vehicles in the field of view of the vehicle tracking apparatus 10, there may only be four in the immediate vicinity of a particular vehicle 12 (i.e. one in front, one behind and one to either side). In this example, the vehicle tracking apparatus 10 may be configured to only provide kinematic data to the particular vehicle 12 in relation to the vehicle itself 12 and the four vehicles in its immediate vicinity. Furthermore, it may be that the vehicle 12 has itself left the field of view of the tracking apparatus 10 but the vehicle behind it has not and is not yet in the field of view of the next tracking apparatus in the direction of travel. In this case the tracking apparatus will continue to provide the vehicle 12 with the kinematic data for the vehicle behind it until the vehicle behind it leaves its field of view.

The method 170 of FIG. 9 relates to a process in which kinematic data is only transmitted to another vehicle tracking apparatus 10 when a vehicle is about to pass out of the field of view of a particular tracking apparatus 10. However, in some embodiments, the vehicle tracking system 150 is configured to constantly transmit calculated kinematic data to other vehicle tracking apparatuses 10 in the system 150. This may be used where a voting system is employed to ascertain whether determined kinematic data is agreed upon by a plurality of the apparatuses 10 and to prevent transmission of incorrectly calculated data. In such an embodiment, the method 170 may be adapted such that when kinematic data is transmitted to a vehicle 12 at Step 186, it is concurrently sent to other vehicle tracking apparatuses 10. This may be transmitted to all other apparatuses 10 in the system 150, or just a subset (for example, upstream and downstream neighbouring apparatuses 10). In such embodiments, Steps 188 and 190 may be omitted as it is not necessary to determine whether a vehicle is passing out of the field of view of a particular apparatus 10. Alternatively, these steps may still be carried out in order to inform a downstream neighbouring apparatus 10 that data regarding a particular vehicle 12 will no longer be received from the present apparatus 10.

It is to be appreciated that the method 170 of FIG. 9 may be suitably modified in order to take into account the various modifications of each vehicle tracking apparatus 10 in the vehicle tracking system 150. In particular, information regarding ground space envelopes 36 may be utilised in methods analogous to those described above in order to determine vehicle 12 positions.

Figure 10:
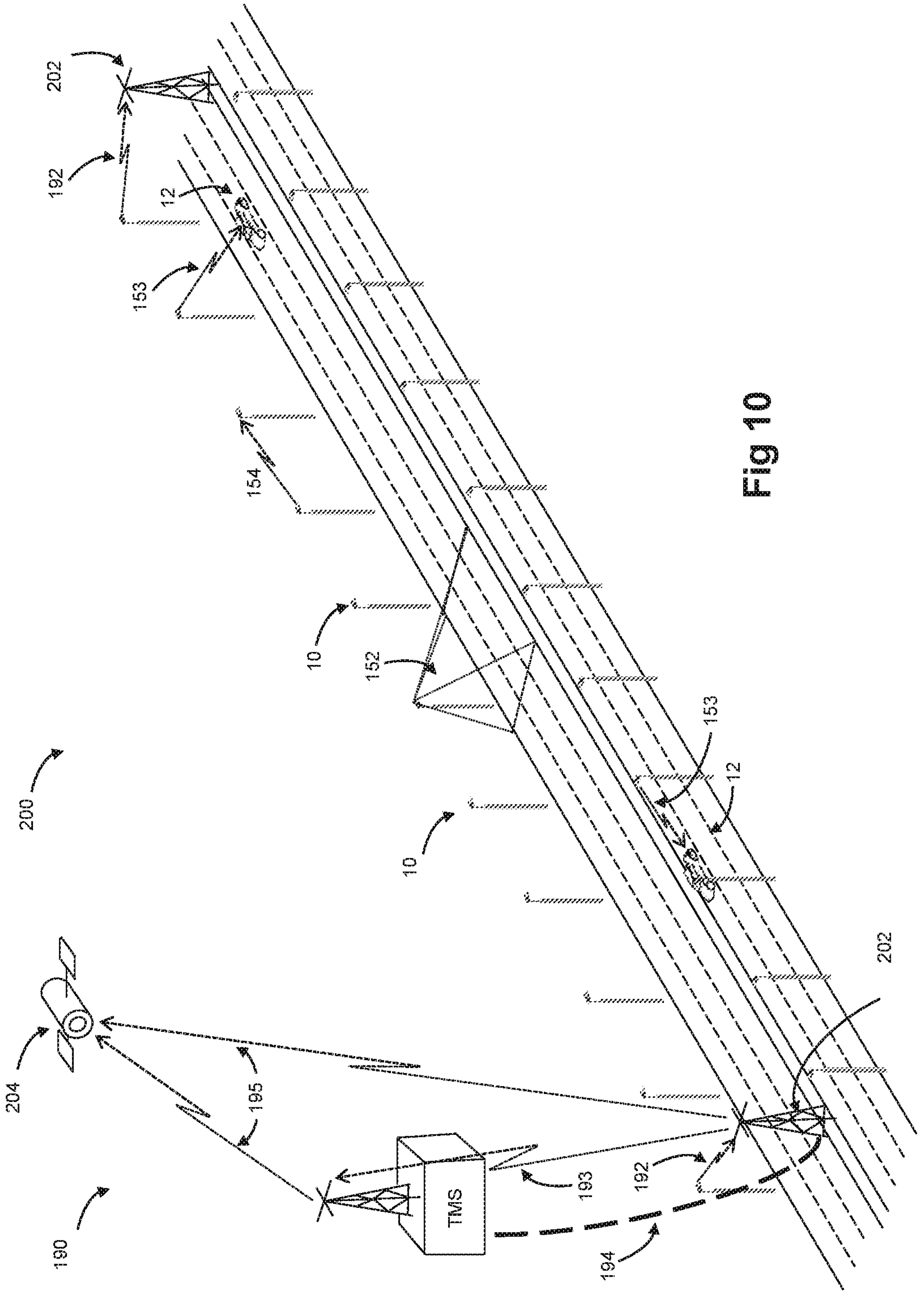
FIG. 10 is an isometric view of a vehicle tracking system comprising a remote communications device in accordance with an embodiment of the present invention.

Referring now to FIG. 10, there is shown a vehicle tracking system 200 comprising a plurality of the vehicle tracking apparatuses 10 of embodiments described above for detecting one or more ground-based vehicles 12 and determining various kinematic data in respect of the detected vehicles 12. For the purposes of clarity, not all of the vehicle tracking apparatuses 10 have been labelled in the figure. In addition, the vehicle tracking system 200 further comprises a remote communications device 202 (shown schematically as a communications mast in FIG. 10) configured to receive remote data from a wide area communications network and which is configured to transmit the received remote data to one or more of the vehicle tracking apparatuses 10. The one or more vehicle tracking apparatuses 10 which receive the remote data are additionally configured to be able to transmit the remote data to one or more vehicles within the field of the view 152 of the respective tracking apparatus. It is to be appreciated that the vehicle tracking system 200 may include any one or more of the features described with respect to the vehicle tracking apparatus 160 of FIG. 6 in order to achieve the associated functionality of these features.

In certain circumstances, it can be beneficial to be able to communicate data which is remote from a vehicle to that vehicle. Such data may include data which relates to operation of the vehicle (such as navigation data). It may also include other types of more general-purpose data, such as for browsing of the internet on a device connected to the vehicle. Typically, data connections to vehicles can be intermittent, particularly in locations which are distant from broadcasting masts which are able to convey such data to a vehicle (for example, on a highway) or can suffer from multipath reflections which create noise and distort the received signal (typical in built-up areas particularly with tall buildings). The provision of the vehicle tracking system 200 of FIG. 10 allows for more reliable transmission of data, even in such remote or built-up locations. One such example of where such data may need to be supplied relates to the provision of data from a TMS. A TMS may be located anywhere in the locality of the vehicle tracking system 200 in question and in some cases, the location of the TMS may be remote from the vehicle tracking system 200. In such cases, the provision of the remote communications device 202 can enable communication between the TMS and the one or more vehicles in spite of the remote location. This is particularly advantageous as typically a TMS will be placed at a central location in order to receive information from a plurality of different traffic locations. The ability to provide reliable communication links between the TMS and the plurality of different locations is particularly enabled by the provision of the vehicle tracking system 200 of FIG. 10.

Returning to FIG. 10 the vehicle tracking system 200 is shown in the context of a six-lane highway. The functional and performance characteristics of data transmission 153 between a tracking apparatus 10 and vehicle 12 have been described in paragraphs above as requiring transmission latency of the order of 1-2 ms and a data transmission rate of around 1 Kbit every 10 ms in order to provide the tracking accuracy required for safety critical vehicle control. Similar requirements apply to the transmissions 154 between tracking apparatuses 10. It is to be appreciated that the description of the operation of the vehicle tracking system for tracking one or more local vehicles has been described in detail above and will not be replicated here for ease of readability.

The remote communications device 202 is shown located in the proximity of one or more of the vehicle tracking apparatuses 10 of the vehicle tracking system 200. Is to be appreciated that the remote communications device 202 may be either an item of equipment which exists in isolation of the one or more tracking apparatuses 10, or in certain circumstances may be located within a vehicle tracking apparatus 10. The remote communications device 202 contains one or more receivers (not shown) configured to receive remote data from a remote device over a wide area communications network. Such data may be received through wired or wireless means. The remote communications device 202 additionally contains one or more transmitters (not shown) configured to transmit the remote data to one or more of the plurality of vehicle tracking apparatuses 10 through wired or wireless means. One or more of the vehicle tracking apparatuses 10 is provided with a receiver configured to receive the transmitted remote data. This may be the same receiver 40, as previously referred to, or may be an additional dedicated receiver. This one or more vehicle tracking apparatuses 10 is additionally provided with one or more transmitters configured to transmit the remote data to one or more vehicles in the field of view of the vehicle tracking apparatus. This may be the same transmitter 50 as previously referred to, or may be an additional dedicated transmitter. In particular, examples the remote communications device 202 may be provided with a satellite communications receiver for communication with a satellite 204. In some cases, this satellite receiver may specifically comprise a OneWeb satellite communications receiver. Additionally or alternatively, the remote communications device 202 may also be provided with a 4G or a 5G telecommunications receiver.

In some use scenarios, the remote communications device 202 is configured to transmit remote data to each of the one or more vehicle tracking apparatuses 10 in parallel i.e. each of the one or more vehicle tracking apparatuses 10 in the vehicle tracking system 200 is configured to receive a transmission from the remote communications device 202 independently from one another. In other use scenarios, the remote communications device 202 is configured to communicate directly with one particular vehicle tracking apparatus 10 and transmit remote data to this one vehicle tracking apparatus 10 only. This vehicle tracking apparatus 10 receiving this remote data is then configured to transmit the remote data to another vehicle tracking apparatus 10. This procedure may repeat until the remote data is transmitted to all of the vehicle tracking apparatuses 10 in the vehicle tracking system 200. In some use scenarios, the transmission of data between vehicle tracking apparatuses 10 continues until the data is transmitted to a vehicle tracking apparatus 10 which is in communication range of a vehicle 12 that is the intended recipient of the data.

In further use scenarios, the remote communications device 202 is additionally configured to receive local data from the one or more vehicle tracking apparatuses 10. This data can include the kinematic data determined by the one or more vehicle tracking apparatuses 10. The data can further include requests for remote data from a wide area communications network. In this use scenario, the one or more vehicle tracking apparatuses 10 are configured to receive requests for remote data from one or more vehicles in the field of view of the relevant vehicle tracking apparatus 10 and to subsequently transmit these requests to the remote communications device 202. The previously mentioned transmitters and receivers of the remote communications device 202 and the one or more vehicle tracking apparatuses 10 may be appropriately configured to receive and transmit these requests. Alternatively, additional dedicated transmitters and receivers may be provided for this purpose. In some use scenarios, the remote communications device 202 is also configured to transmit any received kinematic data to the one or more vehicle tracking apparatuses 10. This enables the remote communications device 202 to deliver the remote kinematic data determined by a particular vehicle tracking apparatus 10 to another vehicle tracking apparatus 10. This may be used in addition to, or alternatively to, methods described above for transmitting determined kinematic data between vehicle tracking apparatuses 10.

In scenarios where the remote communications device 202 is configured to receive local data as described above, the remote communications device 202 may additionally be configured to transmit this data to a remote device which is located separate to the vehicle tracking system 200. This may include a TMS. It may also comprise any device which is configured to receive and deliver data such as a web server.

It is also to be appreciated that whilst FIG. 10 shows one remote communications device 202, the vehicle tracking system 200 may include a plurality of remote communications devices 202, with each device 202 placed in a location geographically spaced apart from one another. The spacing of the remote communications devices 202 may be determined by the communications range and performance requirements of the data being delivered. In this manner, the delivery of data is enabled across a wide geographical region whilst at the same time minimizing the amount of communications equipment required for providing access to the wide area network.

Turning to an example in which the remote communications device 202 is configured to deliver and receive data to and from a TMS, in accordance with embodiments described above, the performance attributes for communication with a TMS will be dependent upon the corresponding functional and performance characteristics of the wider overall system 200. It may be that transmission to a TMS is for the purpose of monitoring only or it may be that the TMS will monitor and provide traffic management advisories and warnings or it may be that the TMS will provide closed loop control right back to the vehicle traffic (in accordance with embodiments describing the provision of a control signal above). Each of these use cases has increasing performance demands (higher data rates, reduced latencies, higher data integrities) on the systems and technologies being used.

FIG. 10 shows a number of possible methods for the data from a large number of vehicle tracking apparatuses to be transmitted to a TMS and for advisory, warning, control or other information to be received back. The transmission 154 between adjacent or nearby tracking apparatuses, which may be wired or wireless, can be extended so that a group of tracking apparatuses (in FIG. 10 they are in groups of 20) are linked 192 to TMS communication equipment 202 mounted at extended intervals along the road, or throughout an urban environment. That arrangement may be serial (from one apparatus to the next accumulating data and then on to the TMS communication equipment) or parallel (from each apparatus directly to the TMS communication equipment 202) depending upon the performance and possibly other requirements.

The TMS communication equipment 202 at the roadside can then communicate with the TMS and several different possible communications technology classes are shown in FIG. 10. The communications link to the TMS can be via wired telecoms 194, or via wireless means, e.g. long-range WiFi or radio data link 193 such as a 4G or a 5G link, or via satellite communications195, e.g. low earth orbit or geostationary satellite system 204.

The latency capabilities of these technology classes range from a few to 500 ms and the capacity capabilities from 10 Mbps to 1 Gbps. The specific technologies described earlier for the tracking apparatus to vehicle and tracking apparatus to tracking apparatus transmissions are equally relevant here although the arrangement in FIG. 10 is most likely to be efficient and effective. A network slice of the 4GLTE/5G network may provide all of the necessary communication links. However, these technologies often remain poorly populated on long distance routes and the option of linking from the roadside, city and urban stations, 202 direct to a low earth orbit satcom system 195, 204 such as OneWeb is likely to be advantageous. This system has a potential latency of 50 ms and more than adequate data rate capacity.

In the example of FIG. 10, the communication is shown between the remote communications device 202 and a TMS via several different communication systems as described above. It is to be appreciated that communication systems with other remote devices (as highlighted above) may be additionally provided such that there is a dedicated communications channel between the TMS and the remote communications device 202 (in accordance with embodiments described above) and separate communications channels between the remote communications device 202 and other remote devices.

As noted above, the embodiment of FIG. 10 enables a flow of data between one or more vehicles 12 and a remote device over a wide area communications network via use of one or more appropriately configured vehicle tracking apparatuses 10 and an appropriately configured remote communications device 202 in accordance with any of the embodiments described above. In particular, the above embodiments enable local data to be transmitted from the one or more vehicles 12 to a remote device in this manner. Whilst the above embodiments describe such local data in the context of requests for remote data from a wide area communications network, it is to be appreciated that the system of FIG. 10 may be additionally configured to enable different types of local data from a vehicle to be received by a remote device. Such local data may typically comprise data relating to internal and external vehicle conditions, data relating to drivers/pilots/passengers of the vehicle and conditions of the environment in the proximity of the vehicle.

As described above, each vehicle tracking apparatus 10 comprises one or more receivers 40 configured to receive wireless communications from a vehicle 12. In some embodiments, these receivers 40 are configured to receive different types of local data which may be transmitted to a remote device in accordance with embodiments described above. In alternative embodiments, additional dedicated transmitters and receivers are provided to the vehicle tracking apparatuses 10 for this purpose.

The transmission of local data as enabled by the embodiment of FIG. 10 enables the provision of this data to any number of data collection systems that are configured to receive the data over the wide area communications network. In this manner, these systems are provided with a convenient way of receiving real-time data and non-real-time data from the one or more vehicles 10. Furthermore, due to the availability of precise location data available for each of the one or more vehicles 10 using the vehicle tracking apparatuses 10 and systems 150 described in embodiments above, the received local data may also advantageously comprise this location data in addition to the other information described above and below. This combination of location data with other information can provide the data collection systems which receive this information with sufficient data to perform a more in-depth analysis than is possible in presently known systems. In other embodiments, the precise location data which is enabled by the vehicle tracking apparatuses 10 and systems 150 may not be required although less precise location data may still be of use. In such scenarios, the local data may additionally comprise GPS data (or other location data) of the vehicle.

Examples of the different types of local data which may be transmitted and use scenarios are shown below:

- Vehicle diagnostics & prognostics data, to be sent to vehicle manufacturers, maintenance and emergency breakdown/recovery organisations, for both ground and airborne vehicles. The use of this data may enable manufacturers to determine lifetimes of components of vehicles, as well as enable breakdown and recovery organisations to determine that a breakdown has occurred and where the broken-down vehicle is located. The use of the precise location data enabled by the vehicle tracking apparatuses 10 and systems 150 enables more precise determination of vehicle location for these purposes.
- Vehicle track history combined with driver control input data (driven vehicles) or autonomous control data, for use by maintenance, insurance and hiring/leasing organisations, for both ground and airborne vehicles. Again, the use of precise location data enabled by the vehicle tracking apparatuses 10 and systems 150 enhances the quality of the data received for this purpose.
- Driver condition data (in control, monitoring, alert, awake, asleep), for use in piloted ground vehicles. Such condition data may be used to determine the driver's state of alertness as they are piloting/driving the vehicle and may be utilised in determining whether a warning needs to be displayed to the driver. Similarly, the data may also be used in determining portions of the vehicle pathway such as a motorway (freeway) in which alertness of a driver generally decreases (due to features of the pathway) and use this to modify pathway infrastructure such that driver alertness is raised (thereby increasing the safety of the driver as they progress along the pathway).
- Driver health data (e.g. from smart watches or smartphones monitoring human vital parameters). In scenarios in which the driver health data is captured by sensors which are not part of the vehicle, each vehicle may be configured to receive the data from the external sensors before transmitting the data in accordance with embodiments described above.
- Driver/passenger activity data (e.g. what they are doing on their phone/laptop/car controls/entertainment systems) as a function of location/phase of journey, time of day, etc.
- Package delivery precise progress, for use by logistics organisations, in both ground and airborne vehicles. Presently, delivery services are typically unable to provide precise location data of a vehicle or alternatively are reliant on the use of a mobile device within the vehicle in order to determine a proxy location of the vehicle. In particular, the use of a mobile device is disadvantageous due to typically imprecise location data which is recorded and the fact that these devices may easily be switched off or lose reception, which prevents the proxy location of the vehicle from being transmitted.

Vehicle telemetry data for use in determining road condition. Vehicle telemetry data may be transmitted which indicates when a vehicle has passed over a portion of a road which is in poor condition (e.g. a pothole), as well as the precise location of the pothole. This information may be transmitted to maintenance infrastructure hardware that notes the position and existence of the pothole. In some cases, repeated indications from a plurality of vehicles of the existence of the pothole may provide more accurate data regarding the location of the pothole. Similarly, for an air corridor (pathway) there may be local poor visibility issues or other hazards which can be monitored locally and sent to the TMS for informing the airborne vehicles approaching that location of the hazard.

All of this local data which concerns activity specifically related to the ground or airborne vehicle is provided to the vehicle tracking system 150. The system acts as a conduit to provide that information to a remotely located interaction device such as a server, via the wide area network. However, this data can also be stored by the vehicle tracking system at one or more of the remote communications devices 202. The data can subsequently be uploaded to a central server using any of the wide area network communications links and subsequently can be collated and analysed as required. The periodicity of uploading is determined as a function of the amount of storage available at each remote communications device 202.

Having described several exemplary embodiments of the present invention and the implementation of different functions of the device in detail, it is to be appreciated that the skilled addressee will readily be able to adapt the basic configuration of the system to carry out described functionality without requiring detailed explanation of how this would be achieved. Therefore, in the present specification several functions of the system have been described in different places without an explanation of the required detailed implementation as this not necessary given the abilities of the skilled addressee to implement functionality into the system.

Furthermore, it will be understood that features, advantages and functionality of the different embodiments described herein may be combined where context allows.

The invention claimed is:

1. A vehicle tracking device for tracking one or more vehicles at a geographic location of a transport network within which the one or more vehicles are able to move, the vehicle tracking device comprising:

one or more infra-red (IR) sensors having a field of view and being configured to detect IR radiation being emitted from or reflected by the one or more vehicles at the geographic location within the field of view;

a receiver configured to receive transmitted data from another vehicle of the one or more vehicles, the transmitted data including unique identification data which uniquely identifies each of the one or more vehicles and position data which indicates an initial position of each of the one or more vehicles when the one or more vehicles enter the field of view at the geographic location;

a processor configured to determine current kinematic data of the one or more vehicles in at least two dimensions based upon the IR radiation detected by the one or more IR sensors, the received unique identification data and the received position data, the processor further configured to use previously determined current kinematic data of the one or more vehicles as an input to the processor for determination of the current kinematic data for each of the one or more corresponding vehicles; and a transmitter configured to transmit the determined current kinematic data of a particular vehicle of the one or more vehicles to a kinematic data receiver spaced apart from the transmitter.

2. The vehicle tracking device of claim 1, wherein the particular vehicle is a ground-based vehicle.

3. The vehicle tracking device of claim 2, wherein the vehicle tracking device is provided with terrain mapping data, and where the processor is configured to determine current kinematic data in three dimensions based upon one or more of the detected IR radiation, the unique identification data, previously determined kinematic data of each of the one or more vehicles and the terrain mapping data.

4. The vehicle tracking device of claim 1, wherein the particular vehicle is an airborne vehicle.

5. The vehicle tracking device of claim 1, wherein the one or more vehicles comprises at least two vehicles and one of the vehicles is a ground-based vehicle and the other vehicle is an airborne vehicle, and wherein the one or more IR sensors comprises at least two sensors, one IR sensor being configured to detect IR radiation being emitted from or reflected by the ground-based vehicle and the other IR sensor being configured to detect IR radiation being emitted from or reflected by the airborne vehicle.

6. The vehicle tracking device of claim 1, wherein the processor is configured to determine current kinematic data of the one or more vehicles at a frequency of at least 50 Hz.

7. The vehicle tracking device of claim 1, wherein the receiver is additionally configured to receive data relating to a ground-space envelope or an air space envelope of the one or more vehicles and the processor is arranged to use the ground-space envelope or air space envelope to determine relative positioning of the one or more vehicles.

8. The vehicle tracking device of claim 1, further comprising an IR emitter configured to emit IR radiation toward the one or more vehicles.

9. The vehicle tracking device of claim 1, wherein the transmitter is configured to transmit the determined current kinematic data to a kinematic data receiver of a particular vehicle.

10. The vehicle tracking device of claim 1, where the transmitter is configured to transmit the determined current kinematic data of each of the one or more vehicles to a respective kinematic data receiver of the one or more vehicles.

11. The vehicle tracking device of claim 1, wherein the transmitter is configured to transmit the determined current kinematic data to a kinematic data receiver of a remotely located Traffic Management System (TMS).

12. The vehicle tracking device of claim 9, where the processor is further configured to generate a control signal for controlling the particular vehicle of the one or more vehicles based upon the determined current kinematic data of the at least one of the one or more vehicles, wherein the control signal includes instructions which when executed by the particular vehicle cause an alteration of a velocity or position of the particular vehicle, and where the transmitter is further configured to transmit this control signal to the particular vehicle.

13. The vehicle tracking device of claim 1, wherein at least one of the one or more IR sensors is configured to detect IR radiation emitted from or reflected by a fixed geographical reference point, and the processor is further configured to:

determine a position of the vehicle tracking device with respect to the fixed geographical reference point; and use the determined position of the vehicle tracking device when determining the current kinematic data of the one or more vehicles.

14. The vehicle tracking device of claim 1, wherein the current kinematic data of the one or more vehicles determined by the processor, comprises at least a geographic position over time of the corresponding vehicle.

15. The vehicle tracking device of claim 1, wherein the vehicle tracking device is configured to monitor an entry point with a fixed position, and to receive data relating to the fixed position at a particular point in time as the initial position of each of the one or more vehicles.

16. The vehicle tracking device of claim 1, wherein the processor is further configured to generate a pull request to be transmitted by the transmitter which requests the transmission of the unique identifier data and initial position data from the one or more vehicles.

17. The vehicle tracking device of claim 1, wherein the one or more infra-red (IR) sensors has a field of view wide enough to cover movement of people or animals adjacent the transport network.

18. A vehicle tracking system for tracking one or more vehicles, the vehicle tracking system comprising a plurality of vehicle tracking devices as described in claim 1 arranged in a network, and where the transmitter of a first vehicle tracking device is configured to transmit the current kinematic data determined at the first vehicle tracking device and unique identification data of the one or more vehicles to a second vehicle tracking device of the plurality of tracking devices and the receiver of the first vehicle tracking device is configured to receive current kinematic data determined at a third vehicle tracking device of the plurality of vehicle tracking devices and unique identification data of the one or more vehicles from a third vehicle tracking device.

19. The vehicle tracking system of claim 18, wherein the processor of the second vehicle tracking device is further configured to compare current kinematic data of at least one of the one or more vehicles determined locally at the second device with current kinematic data received from and determined at the first vehicle tracking device to determine an agreement between the locally determined current kinematic data and the received kinematic data.

20. The vehicle tracking system of claim 19, wherein the second vehicle tracking device receives the results of data comparisons between at least two other vehicle tracking devices and the processor of the second tracking device is configured to use voting to identify a tracking device that is behaving inconsistently.

21. The vehicle tracking system of claim 18, wherein at least two of the plurality of vehicle tracking devices are arranged to be located geographically adjacent to each other and the IR sensors of the adjacently-located vehicle tracking devices have partially overlapping fields of view.

22. The vehicle tracking system of claim 18, further comprising: a remote communications device comprising:

a remote data receiver configured to receive remote data from a wide area communications network; and a remote data transmitter configured to transmit the remote data to one or more of the plurality of vehicle tracking devices;

wherein the one or more of the plurality of vehicle tracking devices are configured to receive the remote data and to transmit the received remote data to at least one of the one or more vehicles.

23. The vehicle tracking system of claim 22, wherein the remote communications device is configured to transmit the received remote data to each of the plurality of vehicle tracking devices.

24. The vehicle tracking system of claim 23, wherein the remote communications device is configured to transmit the received remote data to each of the plurality of vehicle tracking devices in parallel.

25. The vehicle tracking system of claim 23, wherein a current vehicle tracking device of the plurality of vehicle tracking devices is configured to:

receive the remote data transmitted from the remote communications device directly or via another one of the plurality of vehicle tracking devices; and transmit the received remote data to a further one of the plurality of vehicle tracking devices.

26. The vehicle tracking system of claim 22, wherein the remote communications device is further configured to receive local data from one or more of the plurality of vehicle tracking devices and to transmit the local data to the wide area communications network.

27. The vehicle tracking system of claim 22, wherein a first one of the plurality of vehicle tracking devices is configured to transmit the determined current kinematic data of the vehicle tracking device to the remote communications device and the remote communications device is configured to receive the determined current kinematic data from the first one of the plurality of vehicle tracking devices.

28. The vehicle tracking system of claim 27, wherein a second one of the plurality of vehicle tracking devices is configured to receive the determined current kinematic data from the remote communications device.

29. The vehicle tracking system of claim 27, wherein the remote communications device is further configured to transmit the determined current kinematic data, local to the system, to a remotely-located interaction device.

30. The vehicle tracking system of claim 29, wherein the remote communications device is communicably coupled to a Traffic Management System (TMS) and is configured to transmit determined current kinematic data to the TMS.

31. The vehicle tracking system of claim 30, wherein the remote communications device is configured to receive determined current kinematic data from the TMS.

32. The vehicle tracking system of claim 22, wherein the remote data receiver comprises a satellite communications receiver.

33. The vehicle tracking system of claim 32, wherein the remote data receiver comprises a OneWeb satellite communications receiver.

34. The vehicle tracking system of claim 22, wherein the remote data receiver comprises a 4G or 5G radio telecommunications receiver.

35. The vehicle tracking system of claim 22, wherein the remote data comprises a control signal for controlling a particular vehicle of the one or more vehicles based upon the determined current kinematic data of the at least one of the one or more vehicles, wherein the control signal includes instructions which when executed by the particular vehicle cause an alteration of a velocity or position of the particular vehicle, and where the transmitter of a particular vehicle tracking device proximate to the particular vehicle is further configured to transmit the control signal to the particular vehicle.

36. The vehicle tracking system of claim 22, wherein the remote communications device comprises a plurality of remote communications devices, each one of the remote communications devices being positioned in a location geographically spaced apart from other ones of the plurality of remote communications devices and being configured to transmit the remote data to one or more of the plurality of vehicle tracking devices provided within a geographical region local to the location.

37. The vehicle tracking system of claim 18, the system further comprising: a local communications device comprising:

a local data receiver configured to receive local data from one or more of the plurality of vehicle tracking devices; and a local data transmitter configured to transmit the local data to a remotely-located device via a wide area communications network;

wherein the one or more of the plurality of vehicle tracking devices are configured to receive local data from at least one of the one or more vehicles and to transmit the received local data to the local communications device.

38. The vehicle tracking system of claim 37, wherein the local data comprises one or more of: vehicle diagnostics and prognostics data, driver condition data, driver health data, driver or passenger activity data and vehicle telemetry data.

39. The vehicle tracking system of claim 18, wherein the one or more vehicles are airborne vehicles and a first subset of the plurality of vehicle tracking devices are configured to track one or more airborne vehicles moving at a first altitude and a second subset of the plurality of vehicle tracking devices are configured to track one or more airborne vehicles moving at a second altitude.

40. A method of tracking one or more vehicles at a geographic location in a transport network within which the one or more vehicles are able to move, the method comprising:

providing a vehicle tracking device, the tracking device having a field of view;

receiving transmitted data from another vehicle of the one or more vehicles, the transmitted data including unique identification data which uniquely identifies each of the one or more vehicles and position data which indicates an initial position of each of the one or more vehicles at the geographic location;

detecting IR radiation being emitted from or reflected by the one or more vehicles at the geographic location;

determining current kinematic data of the one or more vehicles based upon the detected IR radiation, the received unique identification data of each of the one or more vehicles and the position data, and further comprising using previously determined current kinematic data of the one or more vehicles for determination of the current kinematic data for each of the one or more corresponding vehicles; and transmitting the determined current kinematic data of a particular vehicle of the one or more vehicles to a spaced-apart receiving position.

41. The method of claim 40, wherein the transmitting step comprises transmitting the current kinematic data to at least one other vehicle tracking device of a plurality of tracking devices at the spaced-apart receiving position.

42. The method of claim 40, wherein the transmitting step comprises transmitting the current kinematic data to a particular vehicle at the spaced-apart receiving position.

43. The method of claim 41, further comprising providing a plurality of the vehicle tracking devices arranged in a network and wherein a first vehicle tracking device of the plurality of vehicle tracking devices, in use, transmits the current kinematic data determined at the first vehicle tracking device and unique identification data of the one or more vehicles to a second vehicle tracking device of the plurality of tracking devices and the first vehicle tracking device, in use, receives current kinematic data determined at a third vehicle tracking device of the plurality of vehicle tracking devices and unique identification data of the one or more vehicles from the third vehicle tracking device; the method further comprising:

receiving at a remote communications device remote data from a wide area communications network; and transmitting the remote data to at least one of the plurality of vehicle tracking devices;

wherein the at least one of the plurality of vehicle tracking devices, in use, receives the remote data and, in use, transmits the received remote data to at least one of the one or more vehicles.

44. The method of claim 41, further comprising providing a plurality of the vehicle tracking devices arranged in a network and wherein a first vehicle tracking device of the plurality of vehicle tracking devices, in use, transmits the current kinematic data determined at the first vehicle tracking device and unique identification data of the one or more vehicles to a second vehicle tracking device of the plurality of tracking devices and the first vehicle tracking device, in use, receives current kinematic data determined at a third vehicle tracking device of the plurality of vehicle tracking devices and unique identification data of the one or more vehicles from the third vehicle tracking device; the method further comprising:

receiving at a local communications device local data from one or more of the plurality of vehicle tracking devices; and transmitting the local data to a remotely-located device via a wide area communications network;

wherein the one or more of the plurality of vehicle tracking devices, in use, receives local data from at least one of the one or more vehicles and, in use, transmits the received local data to the local communications device.

45. The method of claim 40, wherein the transmitting step comprises transmitting the determined current kinematic data to a remotely-located Traffic Management System (TMS).

* * * * *